US010877701B2

(12) United States Patent
Aikawa et al.

(10) Patent No.: US 10,877,701 B2
(45) Date of Patent: Dec. 29, 2020

(54) SCALE-OUT TYPE STORAGE SYSTEM

(71) Applicant: HITACHI, LTD., Tokyo (JP)

(72) Inventors: Ryo Aikawa, Tokyo (JP); Yo Shigeta, Tokyo (JP)

(73) Assignee: HITACHI, LTD., Tokyo (JP)

( * ) Notice: Subject to any disclaimer, the term of this patent is extended or adjusted under 35 U.S.C. 154(b) by 63 days.

(21) Appl. No.: 16/330,791

(22) PCT Filed: Feb. 23, 2017

(86) PCT No.: PCT/JP2017/006703
§ 371 (c)(1),
(2) Date: Mar. 6, 2019

(87) PCT Pub. No.: WO2018/154667
PCT Pub. Date: Aug. 30, 2018

(65) Prior Publication Data
US 2019/0235793 A1 Aug. 1, 2019

(51) Int. Cl.
*G06F 3/06* (2006.01)
*G06F 12/10* (2016.01)
*G06F 3/08* (2006.01)

(52) U.S. Cl.
CPC .............. *G06F 3/0661* (2013.01); *G06F 3/06* (2013.01); *G06F 3/067* (2013.01); *G06F 3/0608* (2013.01); *G06F 3/0647* (2013.01); *G06F 3/0659* (2013.01); *G06F 3/08* (2013.01); *G06F 12/10* (2013.01); *G06F 2212/657* (2013.01)

(58) Field of Classification Search
CPC ........ G06F 3/0661; G06F 3/06; G06F 3/0608; G06F 3/0647; G06F 3/0659; G06F 3/067; G06F 3/08; G06F 12/10; G06F 2212/657
See application file for complete search history.

(56) References Cited

U.S. PATENT DOCUMENTS 8,601,473 B1   12/2013 Aron et al.
9,116,858 B1*  8/2015 Yokoi ............... G06F 15/17331
(Continued)

FOREIGN PATENT DOCUMENTS

JP   2004-334419 A   11/2004
JP   2014-524601 A    9/2014
JP   2015-201057 A   11/2015

OTHER PUBLICATIONS

International Search Report and Written Opinion for PCT/JP2017/006703, dated May 23, 2017.

*Primary Examiner* — Nanci N Wong
(74) *Attorney, Agent, or Firm* — Mattingly & Malur, PC

(57) ABSTRACT

A first node transmitting a non-extension read command which is a read command for reading out data without extending, and in which command a logical address is designated that corresponds to compressed data, to a first nonvolatile memory device. The first node transmits a transfer command to a second node via a network. The transfer command is for transferring between nodes the data to be transferred, the transferred object being the compressed data read out without extending by the first nonvolatile memory device in response to the non-extended read command. The second node transmits, in response to the transfer command, a write command for which the compressed data is the target to write to a second nonvolatile memory device.

11 Claims, 16 Drawing Sheets

(56) References Cited

U.S. PATENT DOCUMENTS

| | | |
|---|---|---|
| 2004/0210628 A1* | 10/2004 | Inkinen .................. H04L 67/22 709/201 |
| 2005/0021900 A1 | 1/2005 | Okuyama et al. |
| 2012/0011340 A1* | 1/2012 | Flynn .................. G06F 12/0246 711/171 |
| 2012/0317333 A1 | 12/2012 | Yamamoto et al. |
| 2013/0151770 A1* | 6/2013 | Hara ..................... G06F 3/0685 711/114 |
| 2015/0293700 A1 | 10/2015 | Sasaki |
| 2016/0004642 A1* | 1/2016 | Sugimoto ........... G06F 12/0871 711/128 |
| 2017/0031994 A1* | 2/2017 | Patterson, III ........ G06F 3/0683 |
| 2017/0046300 A1* | 2/2017 | Klein .................. G06F 13/4282 |
| 2017/0357462 A1* | 12/2017 | Walker ................ G06F 12/0623 |
| 2018/0088812 A1* | 3/2018 | Lee ...................... G06F 3/0625 |

\* cited by examiner

System management table 400

| | | | | |
|---|---|---|---|---|
| 401 — Compression condition | ○ | ○ | - | ... |
| 402 — File name | I | II | III | ... |
| 403 — Logical address | A | C | - | ... |
| 406 — Buffer address | - | - | - | ... |
| 404 — Data size | α | γ | ε | ... |
| 405 — Compressed data size | β | δ | - | ... |

FM management table 500

| | | |
|---|---|---|
| 501 — Compression condition | ○ | ... |
| 502 — Logical address | A | ... |
| 506 — Buffer address | i | ... |
| 503 — Physical address | b | ... |
| 504 — Data size | α | ... |
| 505 — Compressed data size | β | ... |

| | |
|---|---|
| Compression condition | - |
| File name | I |
| Logical address | - |
| Buffer address | - |
| Data size | α |
| Compressed data size | - |

400A-9-2

| | |
|---|---|
| Compression condition | O |
| File name | I |
| Logical address | - |
| Buffer address | i |
| Data size | α |
| Compressed data size | β |

400A-9-3

| | |
|---|---|
| Compression condition | O |
| File name | I |
| Logical address | A |
| Buffer address | i |
| Data size | α |
| Compressed data size | β |

400A-9-4

| | |
|---|---|
| Compression condition | O |
| File name | I |
| Logical address | A |
| Buffer address | - |
| Data size | α |
| Compressed data size | β |

| | |
|---|---|
| Compression condition | O |
| Logical address | - |
| Buffer address | i |
| Physical address | - |
| Data size | α |
| Compressed data size | β |

500A-10-2

| | |
|---|---|
| Compression condition | O |
| Logical address | A |
| Buffer address | i |
| Physical address | b |
| Data size | α |
| Compressed data size | β |

500A-10-3

| | |
|---|---|
| Compression condition | O |
| Logical address | A |
| Buffer address | - |
| Physical address | b |
| Data size | α |
| Compressed data size | β |

| Compression condition | O |
|---|---|
| File name | I |
| Logical address | - |
| Data size | α |
| Compressed data size | β |

400B-13-2

| Compression condition | O |
|---|---|
| File name | I |
| Logical address | C |
| Data size | α |
| Compressed data size | β |

| Compression condition | O |
|---|---|
| Logical address | C |
| Physical address | - |
| Data size | α |
| Compressed data size | β |

500B-14-2

| Compression condition | O |
|---|---|
| Logical address | C |
| Physical address | d |
| Data size | α |
| Compressed data size | β |

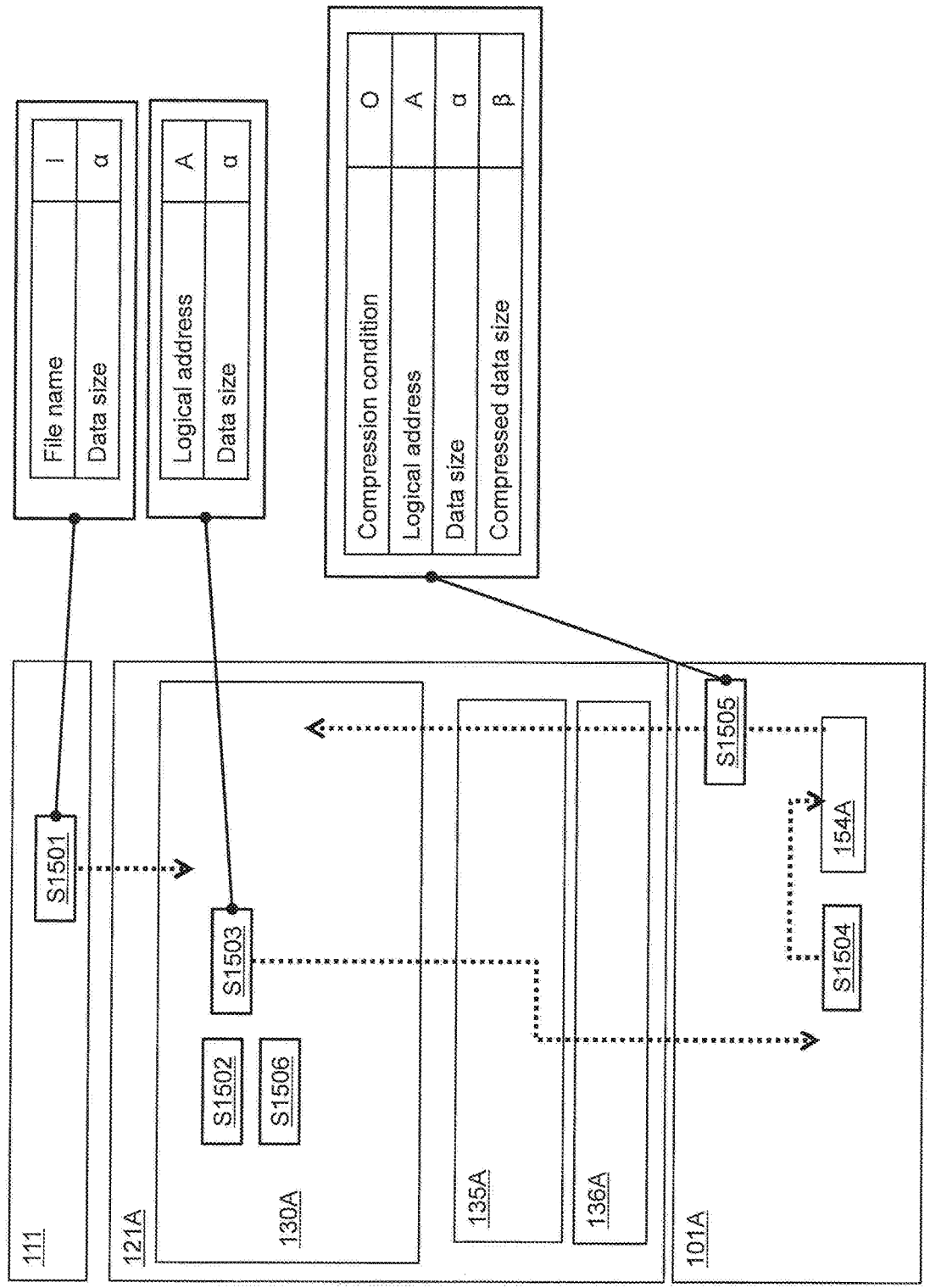

| Compression condition | - |
|---|---|
| File name | I |
| Logical address | A |
| Data size | α |
| Compressed data size | - |

400A-16-2

| Compression condition | O |
|---|---|
| File name | I |
| Logical address | A |
| Data size | α |
| Compressed data size | β |

| Compression condition | - |
|---|---|
| Logical address | A |
| Physical address | - |
| Data size | α |
| Compressed data size | - |

500A-17-2

| Compression condition | O |
|---|---|
| Logical address | A |
| Physical address | b |
| Data size | α |
| Compressed data size | β |

| Compression condition | - |
|---|---|
| File name | I |
| Logical address | - |
| Data size | α |
| Compressed data size | - |

400A-21-2

| Compression condition | O |
|---|---|
| File name | I |
| Logical address | A |
| Data size | α |
| Compressed data size | β |

| Compression condition | X |
|---|---|
| Logical address | - |
| Physical address | - |
| Data size | α |
| Compressed data size | - |

500A-22-2

| Compression condition | O |
|---|---|
| Logical address | A |
| Physical address | b |
| Data size | α |
| Compressed data size | β |

| Compression condition | O |
|---|---|
| Logical address | A |
| Physical address | b |
| Data size | α |
| Compressed data size | β |

500A-23-2

| Compression condition | - |
|---|---|
| Logical address | - |
| Physical address | b |
| Data size | - |
| Compressed data size | - |

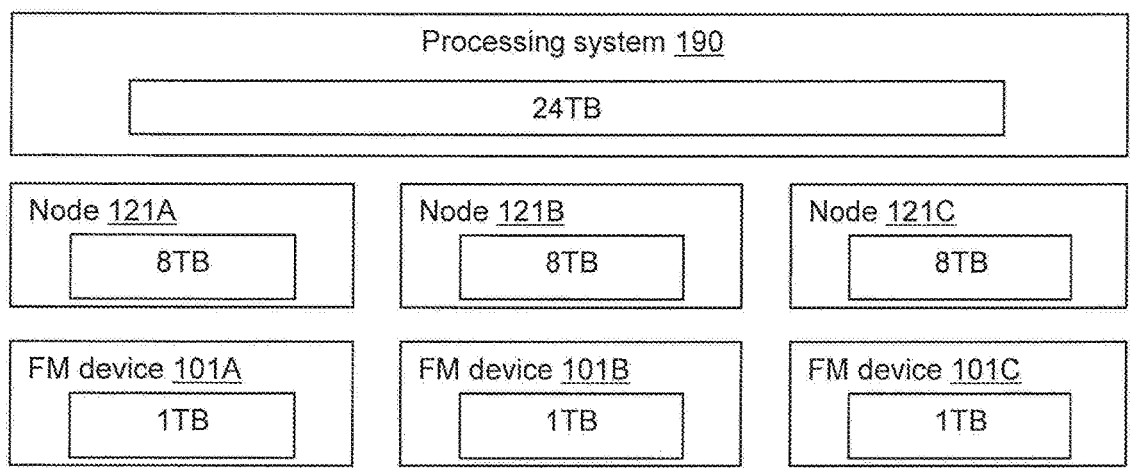

SCALE-OUT TYPE STORAGE SYSTEM

TECHNICAL FIELD

This invention relates generally to a scale-out type storage system.

BACKGROUND ART

In recent years, scale-out type storage systems have become more widespread. One of the features of a scale-out type storage system is that it is possible to adopt an approach of starting from an initial small-scale system configuration satisfying minimum requirements and expanding the system gradually when expansion becomes necessary. Because of this feature, scale-out type storage systems are used as foundations for a cloud environment or an archive environment, and so on.

Meanwhile, with the appearance of storage apparatuses known as All Flash Arrays (AFAs hereafter) (storage apparatuses in which all of the storage devices are flash devices), it has become possible to increase the speed of the access performance to the storage devices, reduce the size and weight of the system configuration, and improve the overall energy efficiency of the system. In an AFA, the installed flash devices have a higher bit cost than an HDD (Hard Disk Drive), and therefore the bit cost is typically reduced by compressing data to be stored. PTL 1 describes a flash device having a data compressing function.

Incidentally, in a scale-out type storage system, data assurance is realized by making the data redundant (including multiplexing the data) across a plurality of nodes using Erasure Coding technology. PTL 2 describes a technique of distributing redundant data over a plurality of nodes by having a processor provided in a node control data transfer.

CITATION LIST

Patent Literature

[PTL 1]
US 2012/0317333
[PTL 2]
U.S. Pat. No. 8,601,473

SUMMARY OF INVENTION

Technical Problem

As regards the processing for transferring data between nodes while making data redundant, when the respective storage devices of the transfer source node and the transfer destination node are HDDs, HDDs typically tends to become a bottleneck due to the relationship between the access speed of the HDDs and the bandwidth of the network coupling the nodes.

When, on the other hand, the respective storage devices of the transfer source node and the transfer destination node are nonvolatile memory devices such as flash devices, the network coupling the nodes highly become a bottleneck due to the relationship between the access speed of the nonvolatile memory devices and the bandwidth of the network linking the nodes.

Solution to Problem

A scale-out type storage system includes a plurality of nodes that include a plurality of nonvolatile memory devices and are coupled to a network. Each of the plurality of nonvolatile memory devices includes a nonvolatile memory. Each of two or more of the plurality of nonvolatile memory devices includes a compressing function, which is a function for compressing or decompressing data. A first node transmits a non-expansion read command for reading data without expanding the data to a first nonvolatile memory device, the non-expansion read command specifying a logical address corresponding to compressed data. The first node transmits a transfer command for transferring transfer target data between nodes to a second node over the network, the transfer command specifying, as a transfer target, the compressed data read from the first nonvolatile memory device in response to the non-expansion read command without being expanded by the compressing function of the first nonvolatile memory device. The second node receives the transfer command. The second node transmits a write command specifying the compressed data as a writing target to a second nonvolatile memory device in response to the received transfer command. The compressed data are data that have been compressed. The first nonvolatile memory device is the nonvolatile memory device, among the plurality of nonvolatile memory devices, that includes the nonvolatile memory storing the compressed data. The first node is the node, among the plurality of nodes, that includes the first nonvolatile memory device. The second node is any node, among the plurality of nodes, other than the first node. The second nonvolatile memory device is the nonvolatile memory device, among the plurality of nonvolatile memory devices, that is provided in the second node.

Advantageous Effects of Invention

The likelihood of a network that couples nodes becoming a bottleneck can be reduced even when the respective storage devices of the transfer source node and the transfer target node are nonvolatile memory devices.

BRIEF DESCRIPTION OF DRAWINGS

FIG. 9 shows the system management table in the compressed writing processing according to the first embodiment.
FIG. 10 shows the FM management table in the compressed writing processing according to the first embodiment.
FIG. 13 shows the system management table in the multiplexing processing.
FIG. 14 shows the FM management table in the multiplexing processing.

FIG. 15 shows in detail a flow of compressed writing processing according to a second embodiment.

FIG. 16 shows the system management table in the compressed writing processing according to the second embodiment.

FIG. 17 shows the FM management table in the compressed writing processing according to the second embodiment.

FIG. 21 shows the system management table in the compressed writing processing according to the third embodiment.

FIG. 22 shows the FM management table in the compressed writing processing according to the third embodiment.

FIG. 23 shows address release according to the third embodiment.

FIG. 24 shows an example of capacity management according to a fourth embodiment.

FIG. 25 shows a configuration of a system management table according to a fifth embodiment.

DESCRIPTION OF EMBODIMENTS

Figure 1:
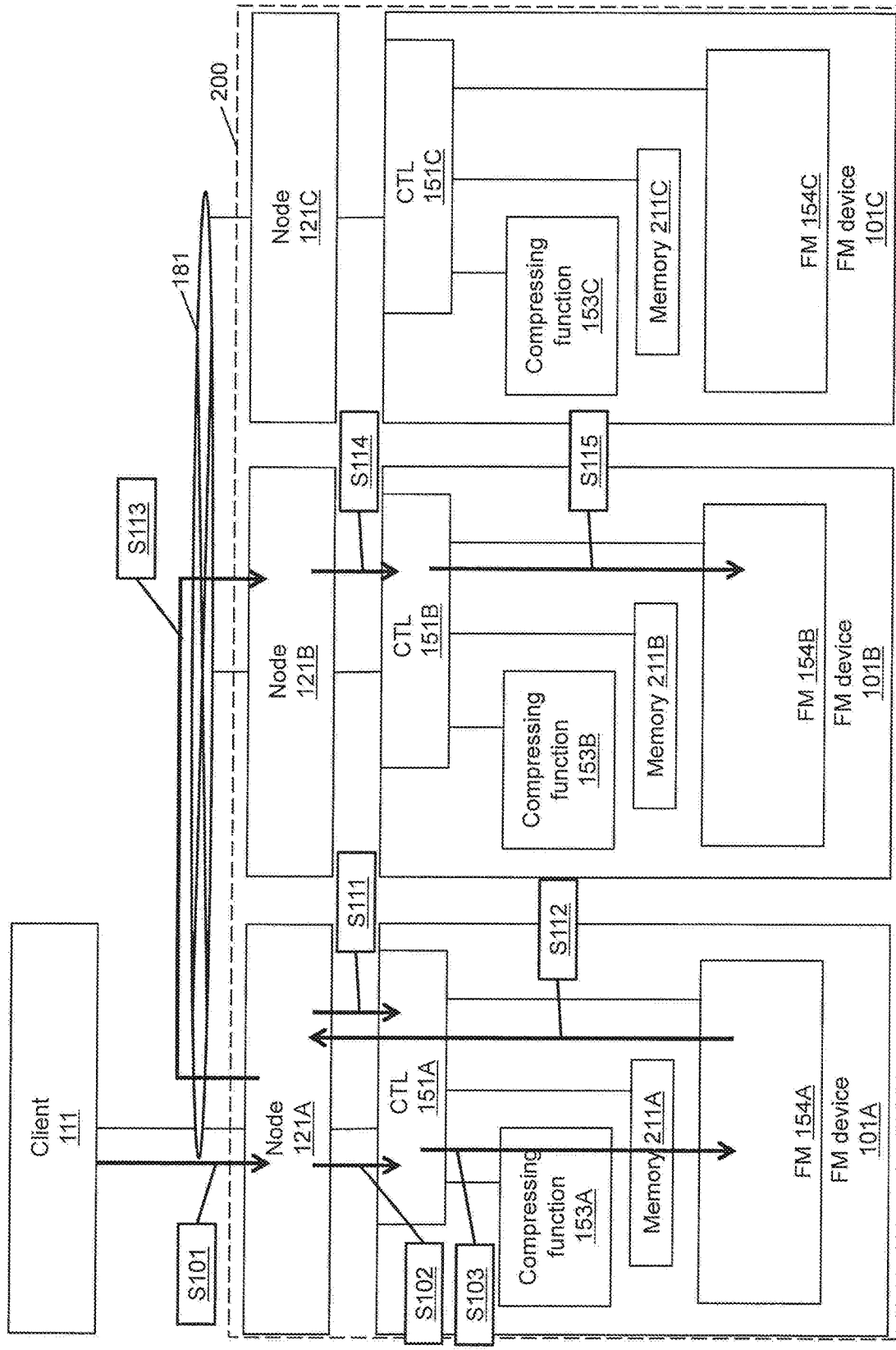
FIG. 1 shows an outline of a first embodiment.

In the following description, the term "abc table" may be used to describe information, but the information may be expressed by a data configuration other than a table. To indicate the point that the information is not dependent on the data configuration, at least one of the "abc tables" may be referred to as "abc information". Moreover, in the following description, the configurations of the respective tables are examples, and one table may be divided into two or more tables, and all or a part of two or more tables may be a single table.

Furthermore, in the following description, the "interface unit" includes one or more interfaces. The one or more interfaces may be one or more interface devices of the same type (one or more NICs (Network Interface Cards), for example) or two or more interfaces devices of different types (an NIC and an HBA (Host Bus Adapter), for example).

Further, in the following description, the "storage unit" includes one or more memories. At least one of the memories in the storage unit may be a volatile memory. The storage unit is mainly used during processing executed by a processor unit.

Furthermore, in the following description, the "processor unit" includes one or more processors. At least one processor is typically a microprocessor such as a CPU (Central Processing Unit). Each of the one or more processors may be a single core processor or a multicore processor. The processor may include a hardware circuit that performs all or a part of the processing.

Moreover, in the following description, the expression "kkk function" is used to describe a function, and functions may be realized either by having the processor unit execute one or more computer programs or by one or more hardware circuits (an FPGA (Field-Programmable Gate Array) or an ASIC (Application Specific Integrated Circuit), for example). When a processing unit is realized by having the processor unit execute a program, fixed processing is performed using the storage unit (a memory, for example) and/or the interface unit (a communication port, for example) as appropriate, and therefore the functions may be considered as at least a part of the processor unit. Processing described using a function as the grammatical subject may be considered as processing performed by the processor unit or an apparatus that includes the processor unit. The described functions are examples, and a plurality of functions may be gathered together into a single function or a single function may be divided into a plurality of functions.

Further, in the following description, processing may be described using "program" as the grammatical subject, but since the programs are executed by the processor unit, whereby predetermined processing is performed using the storage unit (a memory, for example) and/or the interface unit (a communication port, for example) as appropriate, the subject of the processing may be considered to be a processor. Processing described using a program as the grammatical subject may be considered as processing performed by a processor or an apparatus that includes the processor. Further, the processor may include a hardware circuit that performs all or a part of the processing. The programs may be installed in an apparatus such as a computer from a program source. The program source may be a program distributing server or a computer-readable recording medium (a non-transitory recording medium, for example), for example. Furthermore, in the following description, two or more programs may be realized in the form of a single program, and a single program may be realized in the form of two or more programs.

Moreover, in the following description, the "storage apparatus" may be any apparatus having a function for storing data in a storage device. Accordingly, the storage apparatus may be a computer (a general-purpose computer, for example) such as a file server.

Furthermore, in the following description, when elements of the same type are described without distinguishing therebetween, reference symbols are used, and when elements of the same type are described so as to distinguish therebetween, identification numbers of the elements may be used.

Example 1

FIG. 1 shows an outline of a first embodiment. Note that in the following description, to avoid confusion, a request issued from a client to the storage system will be referred to as a "request", and a request issued from a node to an FM device will be referred to as a "command".

A scale-out type storage system (storage system hereafter) 200 includes a plurality of nodes 121A to 121C coupled to a network 181. The plurality of nodes 121A to 121C include a plurality of FM (flash memory) devices 101A to 101C. A client 111 is coupled to the network 181.

The FM device 101 includes an FM (flash memory) 154, a compressing function 153, a memory 211, and a CTL (an FM controller) 151 coupled thereto. The compressing function 153 is a function for compressing or decompressing data, and in this embodiment is a hardware circuit.

In this embodiment, compressed writing processing is performed as one type of writing processing, which is processing for writing data corresponding to a write request. Compressed writing processing is processing for writing data after compressing the data using the compressing function 153 in the FM device 101.

An outline of the compressed writing processing is as follows, for example. The node 121A receives a write request from the client 111 (S101). The node 121A transmits a compression write command, which is a command to compress and write writing target data (data in a file corresponding to the received write request), to the FM device 101A (S102). In response to the compression write command, the CTL 151A of the FM device 101A compresses the writing target data (pre-compression data) corresponding to the compression write command using the compressing function 153A and writes the compressed data (the compressed write target data) to the FM 154A (S103).

Further, in this embodiment, multiplexing processing is performed. Multiplexing processing is processing for multiplexing data, or in other words processing for distributing multiplexing target data among two or more nodes 121 (two or more FM devices 101 of two or more nodes 121). In the multiplexing processing, the multiplexing target data are transferred between nodes via the network 181. "Node-to-node transfer" means transfer from a node 121 to another node 121. In the multiplexing processing according to this embodiment, when the multiplexing target data are compressed data, the compressed data are transferred between nodes in a compressed state without being expanded.

An outline of the multiplexing processing is as follows, for example. The node 121A (an example of a first node) transmits a non-expansion read command, which is a read command for reading data without expanding the data, to the FM device 101A (an example of a first nonvolatile memory device) (S111). In response to the non-expansion read command, the CTL 151A of the FM device 101A reads the compressed data from the FM 154A and sends the compressed data back to the node 121A (S112). The node 121A then transmits a transfer command specifying the compressed data as a transfer target (a command to transfer the transfer target data between nodes) to the node 121B (an example of a second node) via the network 181 (S113). In response to the transfer command, the node 121B transmits to the FM device 101B (an example of a second nonvolatile memory device) a write command to write the compressed data corresponding to the transfer command (S114). In response to the write command, the CTL 151B of the FM device 101B writes the writing target data (the compressed data) corresponding to the command to the FM 154B (S115).

Figure 2:
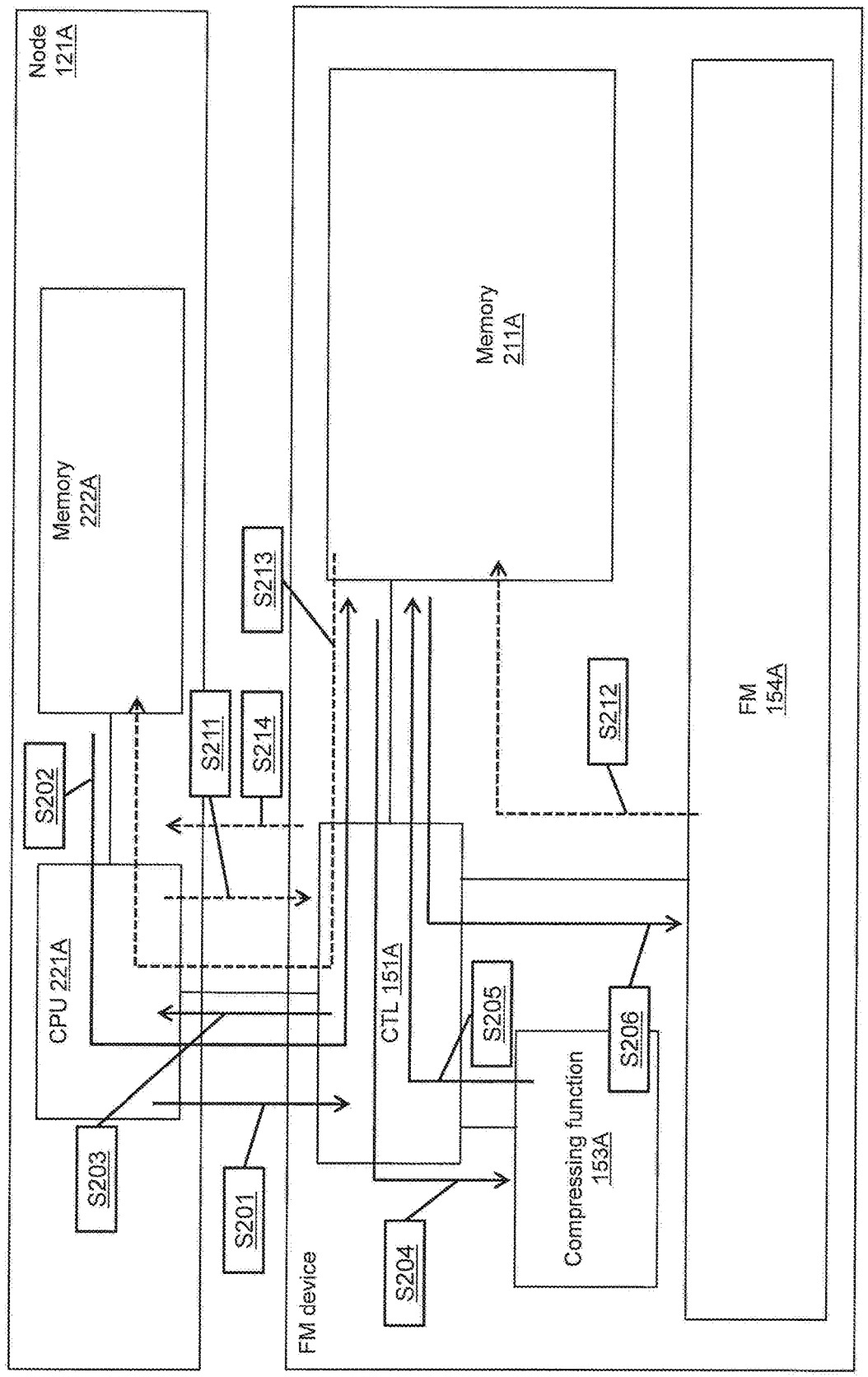
FIG. 2 shows an outline of an example of communication between a node and an FM device.

FIG. 2 shows an outline of an example of communication between the node 121A and the FM device 101A.

The node 121A includes a memory 222A and a CPU 221A. The compression write command and non-expansion read command described above are issued by the CPU 221A.

An issuance of the compression write command is as follows, for example (see solid lines). The write target data are stored in the memory 222A, and the CPU 221A of the node 121A transmits a compression write command to the FM device 101A in relation to the write target data (S201). The write target data in the memory 222A are transferred to the memory 211A of the FM device 101A together with the compression write command (S202). The CTL 151A of the FM device 101A sends a completion response back to the node 121A in relation to the compression write command from the node 121A (S203). The CTL 151A then compresses the write target data (pre-compression data) in the memory 211A using the compressing function 153A (S204), stores the compressed data (compressed write target data) in the memory 211A (S205), and writes the compressed data in the memory 211A to the FM 154A (S206).

An issuance of the non-expansion read command is as follows, for example (see dotted lines). The node 121A transmits the non-expansion read command to the FM device 101A (S211). In response to the non-expansion read command, the CTL 151A of the FM device 101A reads the compressed data from the FM 154A and writes the compressed data to the memory 211A (S212). The compressed data are then transferred from the memory 211A of the FM device 101A to the memory 222A of the node 121A by the CTL 151A of the FM device 101A and the CPU 221A of the node 121A (S213). The CTL 151A then sends a completion response back to the node 121A in relation to the non-expansion read command from the node 121A (S214).

This embodiment will be described in detail below.

Figure 3:
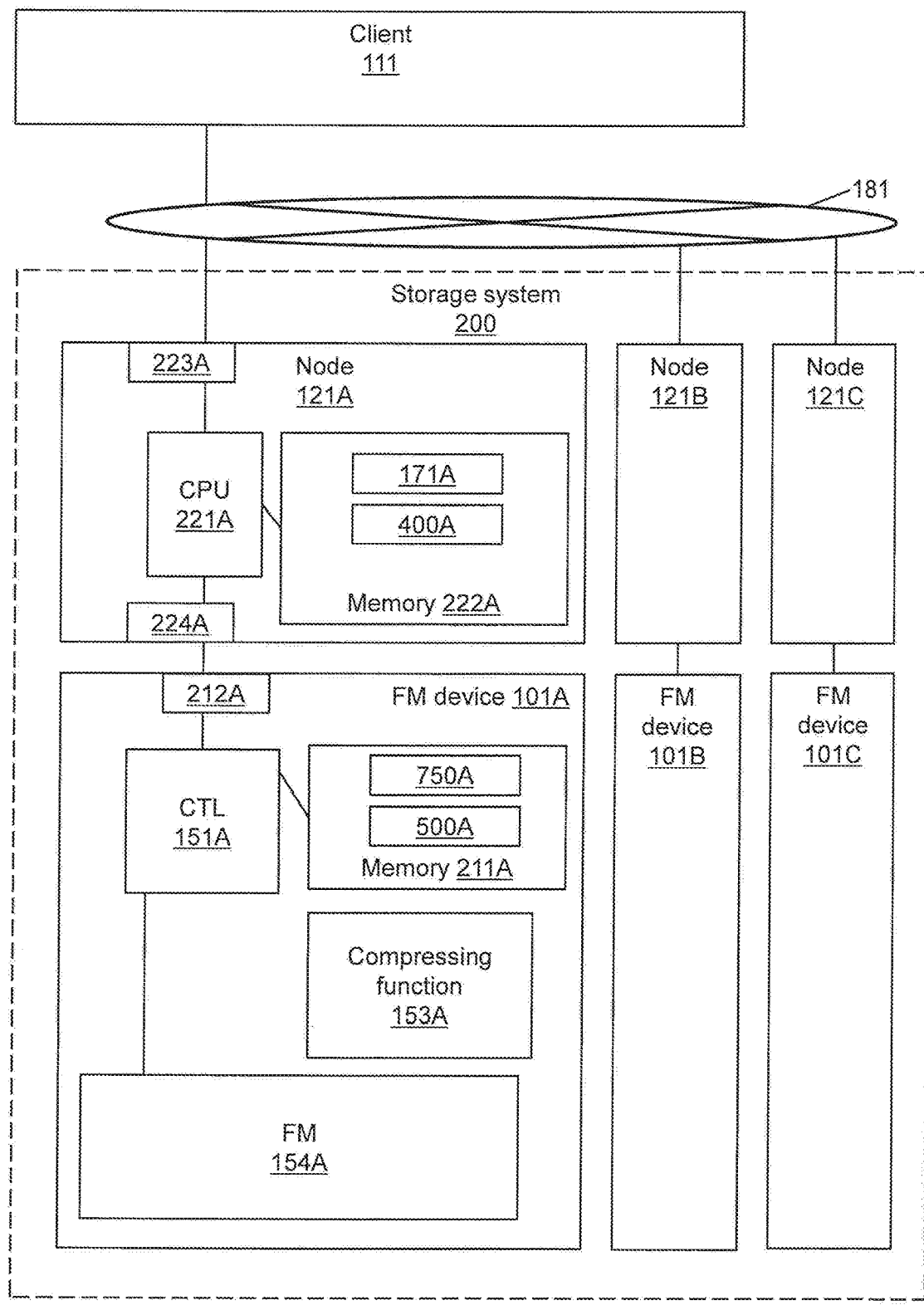
FIG. 3 shows a physical configuration of a storage system.

FIG. 3 shows a physical configuration of the storage system.

The storage system 200 includes the plurality of nodes 121A to 121C. The nodes 121 may be provided in any number larger than or equal to two.

The plurality of nodes 121A to 121C include the plurality of FM devices 101A to 101C. In this embodiment, the correspondence between the nodes 121 and the FM devices 101 is 1:1, but is not limited to 1:1 (for example, the correspondence may be 1:N (where N is an integer of two or more)). Further, according to this embodiment, k is added to the end of the reference numeral of each constituent element of a node 121k (k=A, B, ... ).

The plurality of nodes 121A to 121C are coupled to the network 181. Instead of the front end network 181 to which the client 111 is coupled, the nodes 121 may be coupled via a back end network, and node-to-node transfer may be performed via the back end network.

Taking the node 121A as an example, the hardware configuration of the node 121 will be described. The node 121A includes an FE (front end) interface 223A, a BE (back end) interface 224A, the memory 222A, and the CPU 221A coupled thereto. The FE interface 223A serves as an example of a second interface unit, and is coupled to the network 181. The BE interface 224A serves as an example of a first interface unit, and the FM device 101A is coupled thereto. The memory 222A serves as an example of the storage unit, and stores a program and information. The program includes an upper layer, to be described below, a program for realizing a storage control function, an OS kernel, and a driver, for example. The information includes a compressing function management table 171A and a system management table 400A, for example. The CPU 221A serves as an example of the processor unit, and executes the program in the memory 222A.

Taking the FM device 101A as an example, the hardware configuration of the FM device 101 will be described. The FM device 101A includes the FM 154A, the compressing function 153A, the memory 211A, an interface 212A, and the CTL 151A coupled thereto. The node 121A (the BE interface 224A) is coupled to the interface 212. A buffer (a storage area) 750A, for example, can be provided in the memory 211A. Further, the memory 211A stores a program and information. The program includes firmware, for example. The information includes an FM management table 500A, for example.

Figure 4:
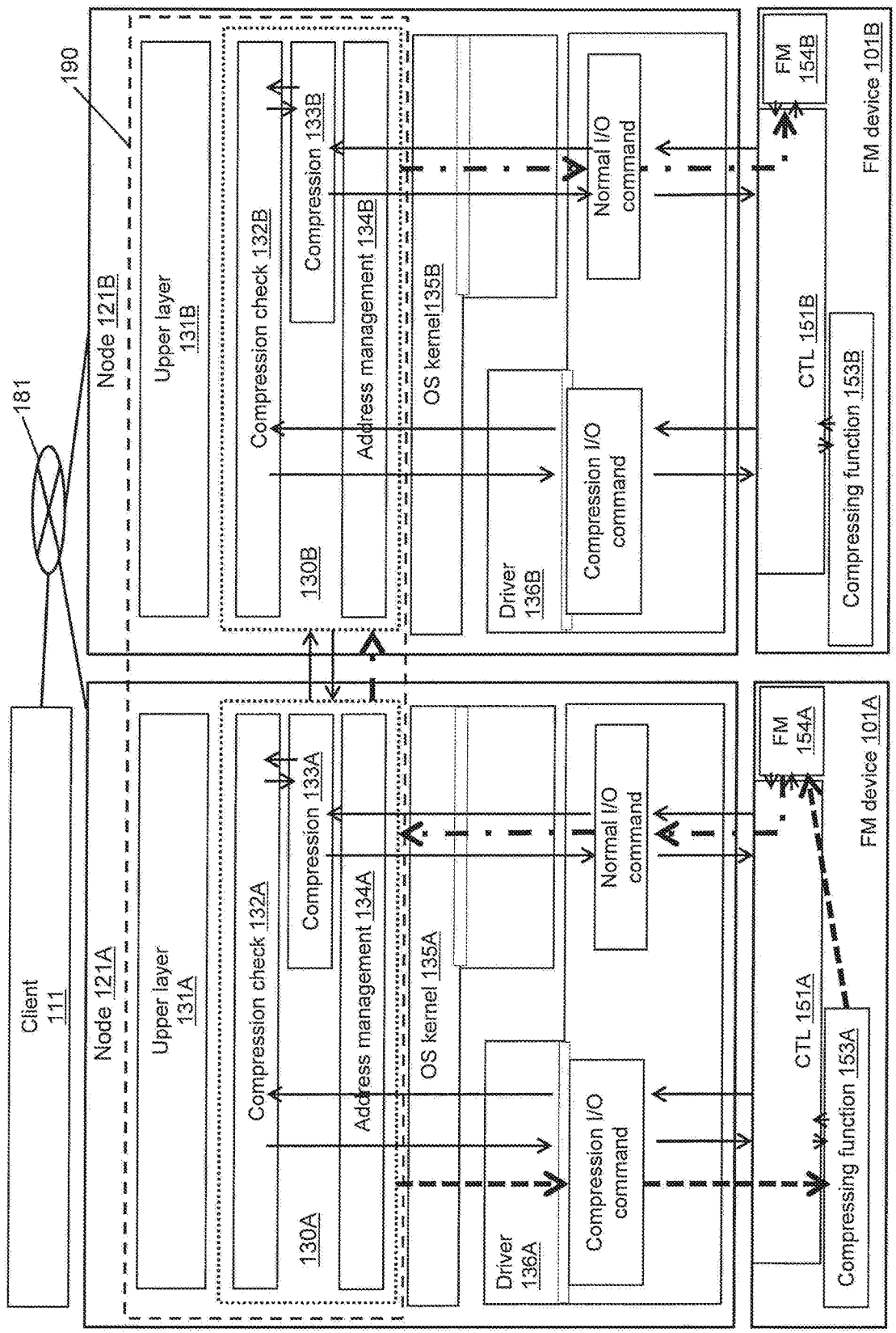
FIG. 4 shows a logical configuration of the storage system.

FIG. 4 shows a logical configuration of the storage system. Note that in the following description, to avoid confusion, a request from the client 111 will be referred to as a "request", a request from an upper layer 131 will be referred to as an "instruction", and a request from a storage control function 130 will be referred to as a "command".

The storage system 200 is a distributed system, a cluster system, or a cloud system, for example. The storage system 200 provides the client 111 coupled to the network 181 with logical volume, for example. The client 111 is a computer that transmits an I/O (Input/Output) request to the storage system. The I/O request is a write request or a read request.

The file name of an I/O target file, for example, is specified in the I/O request. The client 111 serves as an example of an I/O request issuance source. Instead of the client 111, the I/O request issuance source may be a VM (Virtual Machine) executed in the node 121, or the upper layer 131 (an application program, for example) to be described below, for example.

The FM device 101 serves as an example of a nonvolatile memory device. The FM 154 serves as an example of a nonvolatile memory. The FM 154 includes a NAND flash memory, for example, or in other words a plurality of physical blocks, each constituted by a plurality of physical pages. The CTL 151 serves as the processor unit, for example, and is capable of receiving a plurality of types of I/O commands, specifically a normal I/O command and a compression I/O command, to be described below, for example. The CTL 151 also provides a logical address space. The CTL 151 manages correspondence relationships between logical addresses and physical addresses and is capable of executing address translation. In this embodiment, the compressing function 153 is a hardware circuit, but the compressing function 153 may be realized by having the CTL 151 execute a program.

The node 121 is a storage apparatus such as a server, for example a file server. The node 121 includes the upper layer 131, the storage control function 130, an OS kernel 135, and a driver 136. The upper layer 131, the OS kernel 135, and the driver 136 are all programs executed by the processor unit in the node 121, while the storage control function 130 is a function realized by the processor unit in the node 121 executing a program.

The upper layer 131 is a program, for example an application program, for receiving an I/O request from the client 111 and issuing an I/O instruction corresponding to the I/O request.

The storage control function 130 is a function for controlling I/O in accordance with an I/O instruction from the upper layer 131 (or an I/O request from the client 111). The storage control function 130 includes a compression checking function 132, a compressing function 133, and an address management function 134. Further, the storage control function 130 manages a compressing function management table 171 and a system management table 400. The functions 132 to 134 are all realized by the processor unit in the node 121 executing programs. The compression checking function 132 is a function including at least one of a function for checking whether or not the I/O destination FM device 101 includes the compressing function 153 and a function for executing a node search to search for a node coupled to the FM device 101 that has a compressing function equivalent to the compressing function 153 in the read source FM device 101. The compressing function 133 is a function for compressing or decompressing data. The address management function 134 is a function for managing the logical addresses in the logical address space provided by the FM device 101. The compressing function management table 171 holds information indicating details (the presence of the compressing function and the type of the compression algorithm, for example) relating to the compressing function 133 and the compressing function 153 with respect to at least each of the nodes 121 other than the own node 121 (the node 121 in which the table 171 is provided).

The storage control function 130 is capable of selectively issuing a plurality of types of I/O commands, for example a normal I/O command and a compression I/O command, as I/O commands corresponding to I/O instructions from the upper layer 131 (or I/O requests from the client 111). The normal I/O command is an I/O command relating to data requiring compression or expansion by the compressing function 133 of the node 121. The compression I/O command is an I/O command relating to data not requiring compression or expansion by the compressing function 133 of the node 121. Examples of the compression I/O command include the compression write command and the non-expansion read command described above. The need for compression or expansion by the compressing function 153 of the FM device 101 is specified in the compression I/O command. In other words, in response to the compression I/O command, I/O target data can be compressed or expanded without being compressed or expanded by the compressing function 133 of the node 121, and compressed data (data that have been compressed) can be written or read as is (without being compressed or expanded by the compressing function 153 of the FM device 101). Note that in this embodiment, the normal I/O command and the compressing function 133 are not essential. I/O commands and the responses thereto pass via the OS kernel 135 and the driver 136 (see the solid line arrow between the storage control function 130 and the FM device 101).

The OS kernel 135 transfers an I/O command from the storage control function 130 to the driver 136 and transfers a response passing via the driver 136 (a response issued by the FM device 101 in relation to the I/O command) to the storage control function 130. When the storage control function 130 receives the response, a response to the I/O instruction may be sent back to the upper layer 131 from the storage control function 130. When the response is sent back to the upper layer 131, the upper layer 131 may send a response to the I/O request back to the client 111.

The driver 136 serves as the driver of the FM device 101.

Each node 121 may have at least one inbuilt FM device 101. In other words, the FM device 101 is not limited to being externally attached to the node 121 and may be built into the node 121.

Further, each node 121 may include a hypervisor (not shown). The hypervisor may generate a server VM that operates as a server and a storage VM that operates as storage. The server VM may include the upper layer 131, and the storage VM may include the storage control function 130, the OS kernel 135, and the driver 136.

Further, a processing system (a distributed system, for example) 190 extending across the plurality of nodes 121 is realized. The processing system 190 includes the upper layer 131 and the storage control function 130. The upper layer 131 (131A and 131B) and the storage control function 130 (130A and 130B) may extend across the plurality of nodes 121. The processing system 190 may provide the client 111 with logical volume. The processing system 190 may manage the amount of used capacity (or the amount of free capacity) within the storage capacity of the logical volume.

All of the nodes 121 are capable of receiving an I/O request from the client 111 via the network 181. Further, all of the nodes 121 are capable of transferring data between another node 121 (see the solid line arrows between the nodes 121).

Examples of the compressed writing processing (see the thick dotted lines) and the multiplexing processing (see the thick dot-dash lines) will be described below.

<Compressed Writing Processing>

In the compressed writing processing, the compressing function 133 of the node 121A is not used. When the node 121A receives a write request from the client 111, the compression checking function 132A checks whether or not the FM device 101A includes the compressing function 153A (if it is known in advance that the FM device 101A includes the compressing function 153A, the check may be skipped). When the compressing function 153 is absent, the compressing function 133 of the node 121A is used instead. In other words, even when the compressing function 153A is absent, it remains possible to write compressed data and use compressed data as the transfer target of node-to-node transfer during the multiplexing processing to be described below.

When the check result is true, the storage control function 130A transmits a compression write command (an example of the compression I/O command) to the FM device 101A to compress and write the write target data (the data of the file corresponding to the write request). The CTL 151A of the FM device 101A receives the compression write command. In response to the command, the CTL 151A compresses the write target data (pre-compression data) corresponding to the command by the compressing function 153A and writes the compressed data (the compressed write target data) to the FM 154A. Although not indicated by a thick dot-dash line, the CTL 151A sends back a response to the compression write command (a completion response).

<Multiplexing Processing>

The multiplexing processing may be started in response to the completion of writing processing (receiving the completion response in relation to the compression write command, for example) or asynchronously with the completion of writing processing. It is assumed hereafter that the multiplexing target data are the compressed data written to the FM 154A during the compressed writing processing described above.

The storage control function 130A of the node 121A transmits a non-expansion read command (an example of the compression I/O command) specifying a logical address that corresponds to the multiplexing target compressed data to the FM device 101A. The CTL 151A of the FM device 101A receives the non-expansion read command. In response to the command, the CTL 151A reads the compressed data from a physical area (an area of the FM 154A) indicated by a physical address that corresponds to the logical address specified in the command and sends the compressed data back to the node 121A (without expanding the compressed data by the compressing function 153A).

The storage control function 130A transmits a transfer command specifying the read compressed data as a transfer target to the node 121B via the network 181.

The storage control function 130B of the node 121B receives the transfer command, and in response to the transfer command transmits a write command specifying the compressed data corresponding to the transfer command as the writing target to the FM device 101B. In this embodiment, the write command is a non-compression write command (an example of the compression I/O command) for writing data without compressing the data. The CTL 151B of the FM device 101B receives the non-compression write command. In response to the non-compression write command, the CTL 151B writes the writing target data (compressed data) corresponding to the command to the FM 154B as is (without compressing the data using the compressing function 153B). As a result, duplicate compression processing, which is a problem that may occur when the target of node-to-node transfer is compressed data, can be avoided.

Note that the node 121B includes the FM device 101B having the compressing function 153B, which is equivalent to the compressing function 153A of the FM device 101A.

For example, the compression checking function 132A executes a node search to search the compressing function management table 171A for a node 121, among the nodes other than the node 121A, having the FM device 101 that includes the same compressing function as the compressing function 153A (the compressing function used to compress the multiplexing target data), and the node 121B is the node found in the node search. The transfer destination of the compressed data is the node 121B connected to the FM device 101B having the compressing function 153B that is equivalent to the compressing function 153A. Therefore, when the node 121B receives a read request specifying the pre-compression data of the compressed data as a read target from the client 111, the node 121B can receive the pre-compression data, i.e. the data acquired by expanding the compressed data by the compressing function 153B of the FM device 101B, from the FM device 101B and send the pre-compression data back to the client 111 by transmitting an expansion read command (an example of the compression I/O command), which is a command for expanding the compressed data by the compressing function 153B, to the FM device 101B.

Moreover, in the multiplexing processing (or read processing), the compression checking function 132A of the storage control function 130A may check whether or not the FM device 101A storing the read target data includes the compressing function 153A (if it is known in advance that the FM device 101A includes the compressing function 153A, the check may be skipped). When the check result is true, the storage control function 130A may transmit the aforesaid non-expansion read command to the FM device 101A. When, during the read processing, expanded data are required but the compressing function 153A is absent, for example, the compressing function 133A of the node 121A can be used instead. In other words, the expanded data can be acquired even when the compressing function 153A is absent. Note that the compression algorithm of the compressing function 133A is equivalent to the compression algorithm of the compressing function 153A.

According to the above description, node-to-node transfer having compressed data as the transfer target can be executed during the multiplexing processing. Hence, the load on the network 181 can be lightened, and as a result, the likelihood that the network 181 becomes a bottleneck can be reduced even when the FM device 101 is employed as the storage device of the node 121.

Further, according to the above description, compressed data can be transferred in a non-expanded state using the non-expansion read command and the non-compression write command serving as examples of the compression I/O command.

Furthermore, according to the above description, processing related to compression (for example, checking whether or not a compression I/O command can be used (whether or not the compressing function is present)) is performed by the storage control function 130, which is of a lower order than the upper layer 131. As a result, the effects of compression do not have to be considered on the upper layer 131.

Moreover, according to the above description, compression is performed by the FM device 101 rather than the processor unit (the CPU) in the node 121. Therefore, no overheads occur with respect to compression/expansion processing performed by the processor unit in the node 121, and as a result, an improvement in system performance can be expected.

The storage system 200 provides the client 111 with logical volume, and in this embodiment, the following capacity management is employed.

Figures 5, 6, 7:
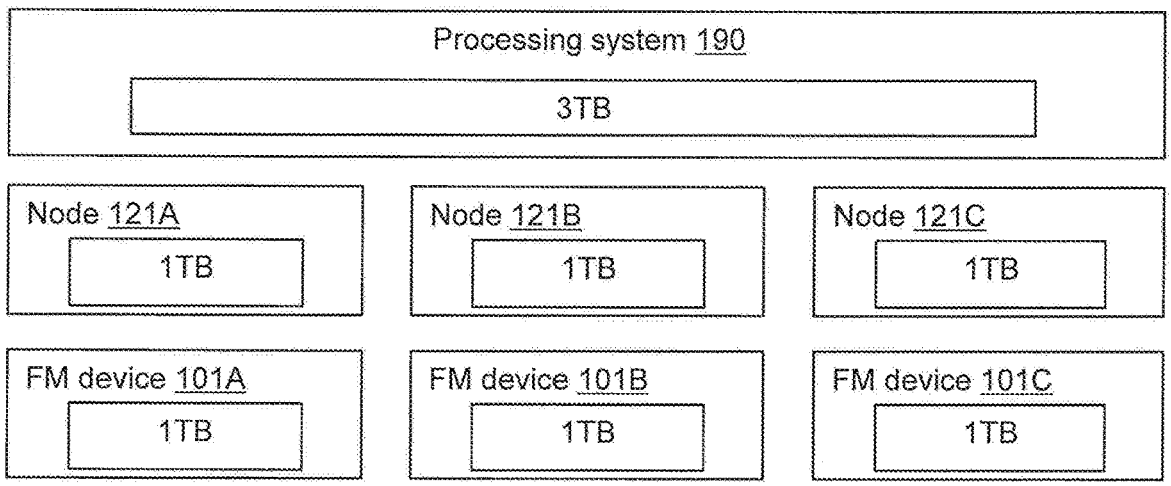
FIG. 5 shows an example of capacity management according to the first embodiment.
FIG. 6 shows a configuration of a system management table according to the first embodiment.
FIG. 7 shows a configuration of an FM management table.

FIG. 5 shows an example of capacity management.

It is assumed, for example, that the FM devices 101A to 101C each provide the nodes 121A to 121C with 1 TB of logical address space. 1 TB (the capacity of the logical address space) is assumed to be equal to the physical storage capacity of the FM 154.

Likewise, the nodes 121A to 121C each provide 1 TB of logical address space. As a result, 3 TB (=1 TB×3 (the number of nodes)) of logical volume can be seen from the client 111.

In the capacity management according to this embodiment, when a write request for 2 TB of data is received from the client 111 and the data size following compression of the 2 TB of data is 1 TB, the data size of the write target data corresponding to the write request is managed as 1 TB. For example, when the compressing function 133 of the node 121 performs compression, the data size following compression is specified by the storage control function 130. When the compressing function 153 of the FM device performs compression, a notification (a response to the I/O command, for example) including a value representing the data size following compression is transmitted to the node 121. Thus, the processing system 190 can manage the 3 TB of logical volume as 1 TB of used capacity and 2 TB of free capacity. As a result, the free capacity managed by the processing system 190 matches the total free capacity of the FM devices 101A to 101C.

FIG. 6 shows a configuration of the system management table.

The system management table 400 is a table held by the processing system 190. The system management table 400 includes an entry for each file stored in the storage system 200. Each entry holds information constituted by a compression condition 401, a file name 402, a logical address 403, a buffer address 406, a data size 404, and a compressed data size 405. The compression condition 401 expresses whether or not the file (the data) is compressed data. The file name 402 expresses the name of the file. The logical address 403 expresses a logical address indicating the storage location of the file. The buffer address 406 expresses an address in a buffer area (an area of the buffer provided in the memory 211 of the FM device 101). The data size 404 expresses the size of the file. The compressed data size 405 expresses the size of the file following compression (the size of the compressed data).

The storage control function 130 can specify a free logical address range within the logical address space on the basis of the logical addresses 403 and compressed data sizes 405 in the system management table 400.

Note that in this embodiment, the logical addresses are not duplicated over the plurality of FM devices 101. Therefore, the FM device 101 can be specified from the logical address.

Further, in this embodiment, the content of the system management table 400 may be common within the processing system 190. More specifically, for example, all of the nodes 121 may include the system management table 400. Synchronization processing may be performed on the system management table 400. For example, when the system management table 400 is updated in any of the nodes 121, the system management tables 400 in each of the nodes 121 other than that node 121 may be updated similarly.

FIG. 7 shows a configuration of the FM management table.

The FM management table 500 is a table held by the FM device 101. The FM management table 500 includes an entry for each logical address in the logical address space provided by the FM device 101 that holds the table 500. Each entry holds information constituted by a compression condition 501, a logical address 502, a buffer address 506, a physical address 503, a data size 504, and a compressed data size 505. The compression condition 501 expresses whether or not the data (referred to hereafter in this paragraph as the "target data") in the storage location indicated by the logical address are compressed data. The logical address 502 expresses the logical address. The physical address 503 expresses a physical address allocated to the logical address. The data size 504 expresses the size of the target data (the pre-compression data in a case where the target data are compressed data). The compressed data size 505 expresses the size of the compressed data. When the target data are uncompressed data (data that have not been compressed), the compressed data size 505 may take an invalid value ("–", for example).

The compressed writing processing and the multiplexing processing will be described in detail below. Note that the compressed writing processing according to this embodiment will be referred to hereafter as "first compressed writing processing".

Figure 8:
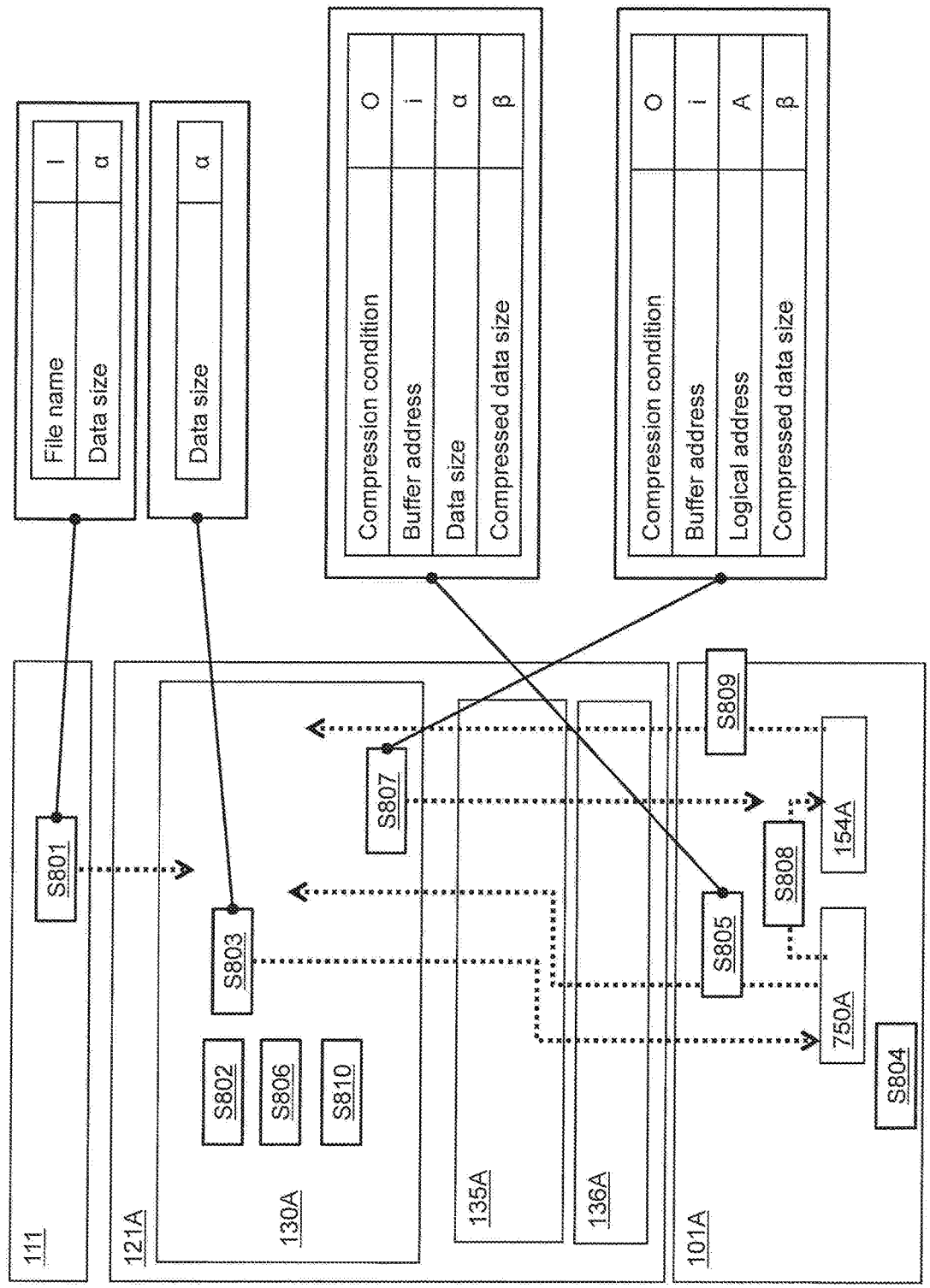
FIG. 8 shows in detail a flow of compressed writing processing according to the first embodiment.

FIG. 8 shows in detail a flow of the first compressed writing processing. The node 121A and the FM device 101A are taken as examples.

In a write command, the logical address range of the write destination must be specified. During write command processing (from issuance of the write command to reception of the completion response), the storage control function 130A locks the logical address range specified by the write command so that at least a part of the logical address range is not specified by another write command. Accordingly, it is desirable for the logical address range specified by the compression write command to be accurate.

In this embodiment, the logical address range is defined by a combination of the logical address and the data size. According to the compression write command, the write target data are written to the FM 154 after being compressed. It is therefore desirable for the storage control function 130A to know the compressed data size before writing the compressed data to the FM 154.

Hence, according to the first compressed write processing, the compressed data are stored temporarily in the buffer of the FM device 101 and written to the FM 121 after the storage control function 130A has been notified of the compressed data size.

More specifically, this is implemented as follows.

The node 121A receives a write request from the client 111 (S801). A file name "I" and a data size "α" of the file are specified in the write request. The storage control function 130A registers the file name "I" and the data size "α" in the system management table 400A (see reference symbol 400A-9-1 in FIG. 9).

The storage control function 130A checks whether or not the FM device 101A includes the compressing function (S802).

When the check result of S802 is true, the storage control function 130A transmits a compression buffer write command to the FM device 101A to compress the pre-compression data (the data corresponding to the write request) and write the compressed data to the buffer (S803). In this command, the data size "α" of the pre-compression data is specified.

In response to the compression buffer write command from the node 121A, the CTL 151A of the FM device 101A executes S804 and S805. More specifically, the CTL 151A compresses the data corresponding to the command by the compressing function 153A and writes the compressed data to the buffer (S804). The CTL 151A then sends a response to the command back to the node 121A (S805). A compression condition "O" (a value meaning that compression has been performed), a buffer address "i" (the address of the area (the area in the buffer) where the compressed data are stored), the data size "α" (the size of the pre-compression data), and a compressed data size "β" (the size of the compressed data) are specified in the response. β is typically smaller than α. Further, in S805, the CTL 151A registers the compression condition "O", the buffer address "i", the data size "α", and the compressed data size "β" in the FM management table 500A (see reference symbol 500A-10-1 in FIG. 10).

The storage control function 130A then executes S806. More specifically, the storage control function 130A adds the compression condition "O", the buffer address "i", and the compressed data size "β" specified in the response from the FM device 101A to the system management table 400A (see reference symbol 400A-9-2 in FIG. 9). On the basis of the compressed data size "β" and the free logical address range, specified from the system management table 400A, the storage control function 130A determines a logical address "A" to be specified as the write destination. The storage control function 130A then adds the logical address "A" to the system management table 400A (see reference symbol 400A-9-3 in FIG. 9).

The storage control function 130A then transmits a buffer data write command (an example of the compression I/O command) specifying the compressed data in the buffer area as the writing target to the FM device 101A (S807). The logical address "A" and the compressed data size "β" and buffer address "i" expressed in the received response are specified in this command.

In response to the buffer data write command from the node 121A, the CTL 151A of the FM device 101A executes S808 and S809. More specifically, the CTL 151A allocates a free physical address "b" to the specified logical address "A" on the basis of the compressed data size "β" and adds the logical address "A" and the physical address "b" to the FM management table 500A (see reference symbol 500A-10-2 in FIG. 10). Then, on the basis of the buffer address "i" and the compressed data size "β", the CTL 151A writes the compressed data in the buffer area to a physical area (an area of the FM 151) indicated by the physical address "b" allocated to the specified logical address "A" (S808). The CTL 151A then sends a response to the command back to the node 121A (S809). In S809, the CTL 151A releases the buffer address "i". More specifically, the buffer address "i" is deleted from the FM management table 500A (see reference symbol 500A-10-3 in FIG. 10).

The storage control function 130A of the node 121A, having received the response, executes S810. More specifically, the storage control function 130A deletes the buffer address "i" from the system management table 400A (see reference symbol 400A-9-4 in FIG. 9).

According to the first compressed write processing, the node 121A can learn the compressed data size before the compressed data are written to the FM 154A, and therefore the logical address range to be locked by the node 121A can be set at an accurate range (in other words, logical addresses can be used economically).

Figure 11:
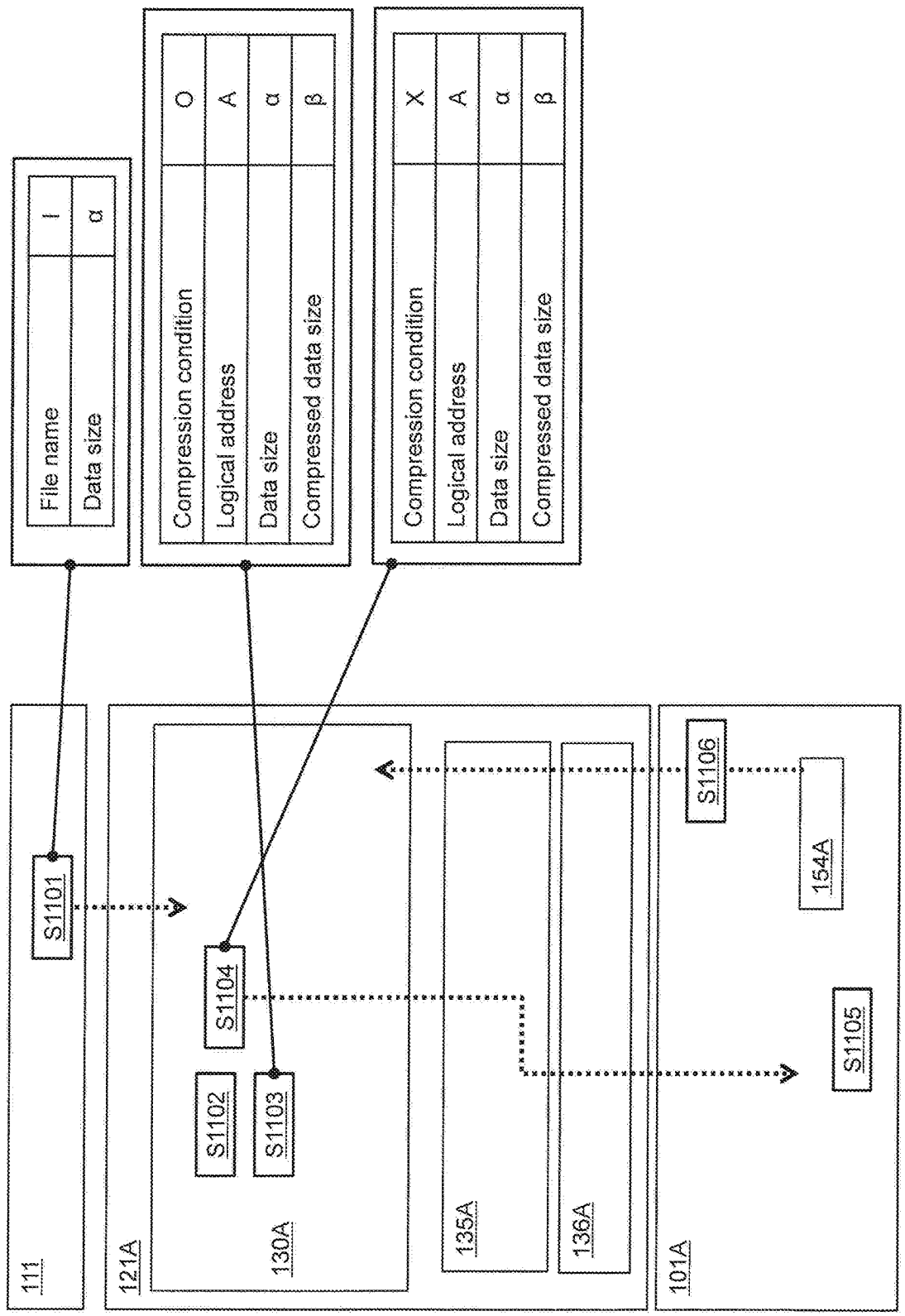
FIG. 11 shows a part of the details of a flow of multiplexing processing.
Figure 12:
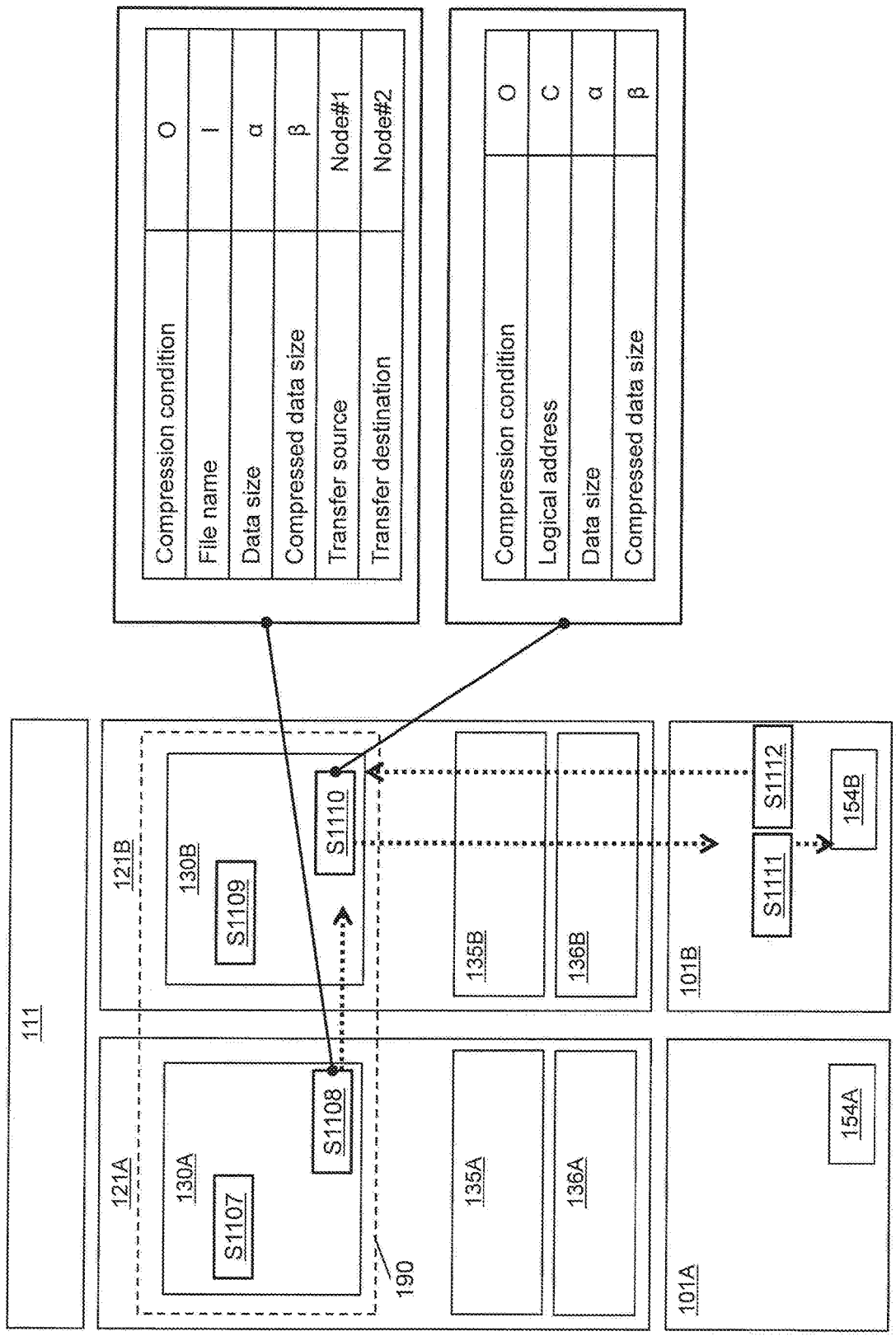
FIG. 12 shows the remaining details of the flow of multiplexing processing.

FIGS. 11 and 12 show the flow of the multiplexing processing in detail.

The node 121A receives a multiplexing request from the client 111 (S1101). The file name "I" of the multiplexing target file and the data size "α" of the file are specified in the multiplexing request.

The storage control function 130A specifies the logical address "A" corresponding to the file name "I" of the multiplexing target file from the system management table and checks for the presence of the compressing function in the FM device 101A corresponding to the specified logical address "A" (S1102).

When the check result of S1102 is true, the storage control function 130A specifies the values corresponding to the file name "I" of the multiplexing target file, i.e. the compression condition "O", the logical address "A", the data size "α", and the compressed data size "β" (S1103) and transmits a non-expansion read command (an example of the compression I/O command) based on the specified values to the FM device 101A (S1104). A compression condition "X", the logical address "A", the data size "α", and the compressed data size "β" are specified in this command. The compression condition "X" means that the target data have not been compressed. The reason for setting the compression condition as "X" in this case will be described below.

In response to the non-expansion read command from the node 121A, the CTL 151A of the FM device 101A executes S1105 and S1106. More specifically, the CTL 151A reads compressed data from a physical area (an area of the FM 154A) indicated by the physical address "b" corresponding to the logical address "A" specified in the command (S1105). The CTL 151A then sends the compressed data back to the node 121A as is (without expanding the compressed data by the compressing function 153A) (S1106).

The storage control function 130A then executes a node search (S1107). In the node search, among the nodes other than node 121A, the compressing function management table 171A is searched for the node 121 having the FM device 101 that includes the same compressing function as the compressing function 153A (the compressing function used to compress the multiplexing target data). It is assumed that the node 121B is found in the node search.

The storage control function 130A then transmits a transfer command specifying the read compressed data as the transfer target to the node 121B found in S1107 via the network 181 (S1108). The compression condition "O", the file name "I" (the file name of the pre-compression data (file) of the compressed data), the data size "α", the compressed data size "β", a transfer source "Node #1" (the ID of the transfer source node 121A), and a transfer destination "Node #2" (the ID of the transfer destination node 121B) are specified in the transfer command.

In response to the transfer command, the storage control function 130B of the node 121B executes S1109 and S1110. More specifically, the storage control function 130B registers the values (the compression condition "O", the file name "I", the data size "α", and the compressed data size "β") specified in the transfer command in the system management table 400B (S1109) (see reference symbol 400B-13-1 in FIG. 13). The storage control function 130B then transmits a non-compression write command (an example of the compression I/O command), which is a write command for writing data without compressing the data and includes the compressed data corresponding to the transfer command as the write target, to the FM device 101B (S1110). The compression condition "O", a logical address "C", the data size "α", and the compressed data size "β" are specified in this command. The logical address "C" is a logical address determined in S1110 as the write destination of the transfer target compressed data. In S1110, the storage control function 130B adds the logical address "C" to the system management table 400B (see reference symbol 400B-13-2 in FIG. 13).

In response to the non-compression write command from the node 121B, the CTL 151B of the FM device 101B executes S1111 and S1112. More specifically, the CTL 151B registers the compression condition "O", the logical address "C", the data size "α", and the compressed data size "β" specified in the command in the FM management table 500B (see reference symbol 500B-14-1 in FIG. 14). The CTL 151B then allocates a free physical address "d" to the logical address "C" on the basis of the compressed data size "β" and adds the physical address "d" to the FM management table 500A (see reference symbol 500B-14-2 in FIG. 14). The CTL 151B then writes the write target data (compressed data) corresponding to the command to a physical area (an area of the FM 151B) indicated by the allocated physical address "d" as is (without compressing the data by the compressing function 153B) (S1111). The CTL 151B then sends a response to the command back to the node 121B (S1112).

The first embodiment was described above. In the first embodiment, either "O" or "X" may be specified in the compressed I/O command at all times as the compression condition. In other words, the CTL 151 of any of the FM devices 101 may perform the processing described below. According to the processing described below, a write command in which "X" is specified as the compression condition is a compression write command, and a write command in which "O" is specified as the compression condition is a non-compression write command. Further, a read command in which "X" is specified as the compression condition is a non-expansion read command, and a read command in which "O" is specified as the compression condition is an expansion read command. According to the following description, the reason for specifying "X" as the compression condition in the read command of S1104 is to avoid expansion of the data by the FM device 101A.

(*) When a write command in which "X" is specified as the compression condition is received, the write target data are written to the FM 154 after being compressed by the compressing function 153. In other words, in this case, the write target is handled as uncompressed data (data that have not been compressed).

(*) When a write command in which "O" is specified as the compression condition is received, the write target data are written to the FM 154 without being compressed by the compressing function 153. In other words, in this case, the write target is handled as compressed data.

(*) When a read command in which "O" is specified as the compression condition is received, the read target data are read from the FM 154 and expanded by the compressing function 153, whereupon the expanded data are sent back. In other words, in this case, the read target is handled as uncompressed data.

(*) When a read command in which "X" is specified as the compression condition is received, the read target data are read from the FM 154 and sent back without being expanded by the compressing function 153. In other words, in this case, the read target is handled as compressed data.

Example 2

A second embodiment will now be described. In this case, the description will focus on differences with the first embodiment, and description of common points with the first embodiment will be omitted or simplified.

In the second embodiment, second compressed writing processing is employed in place of the first compressed writing processing.

FIG. 15 shows in detail a flow of the second compressed writing processing. The node 121A and the FM device 101A are taken as examples.

In the first compressed writing processing, two write commands, namely the compression buffer write command and the buffer data write command, must be issued, and the node 121A must learn the buffer address.

According to the second compressed writing processing, on the other hand, only one write command has to be issued, and there is no need for the node 121A to learn a buffer address.

More specifically, the following processing is implemented.

The node 121A receives a write request from the client 111 (S1501) and checks whether or not the FM device 101A includes the compressing function (S1502).

When the check result of S1502 is true, the storage control function 130A transmits a compression write command to the FM device 101A to compress the pre-compression data (the data corresponding to the write request) and write the compressed data to the FM 154 (S1503). The logical address "A" and the data size "α" are specified in this command. The logical address "A" is a logical address determined in S1503 as the write destination of the data. In S1503, the storage control function 130A registers the file name "I", the logical address "A", and the data size "α" in the system management table 400A (see reference symbol 400A-16-1 in FIG. 16). The file name "I" and the data size "α" are values specified in the received write request.

In response to the compression write command from the node 121A, the CTL 151A of the FM device 101A executes S1504 and S1505. More specifically, the CTL 151A compresses the data corresponding to the command by the compressing function 153A and writes the compressed data to the FM 151A (S1504). The CTL 151A then sends a response to the command back to the node 121A (S1505). In S1504, the CTL 151A registers the logical address "A" and the data size "α" in the FM management table 500A (see reference symbol 500A-17-1 in FIG. 17). Further, in S1504, the CTL 151A allocates the physical address "b" to the logical address "A" on the basis of the compressed data size "β". The write destination of the compressed data is a physical area (an area of the FM 151A) indicated by the physical address "b". Furthermore, in S1504, the CTL 151A adds the compression condition "O", the compressed data size "β", and the physical address "b" to the FM management table 500A (see reference symbol 500A-17-2 in FIG. 17). The compression condition "O", the logical address "A", the data size "α", and the compressed data size "β" are specified in the response of S1505.

The storage control function 130A of the node 121A then adds the compression condition "O" and the compressed data size "β" specified in the response from the FM device 101A to the system management table 400A (S1506) (see reference symbol 400A-16-2 in FIG. 16).

According to the second compressed writing processing, only one write command is required, and there is no need for the node 121A to learn a buffer address.

Note that likewise in the second embodiment, the storage control function 130A locks the logical address range specified by the write command during the write command processing so that at least a part of the logical address range is not specified by another write command.

Figure 18:
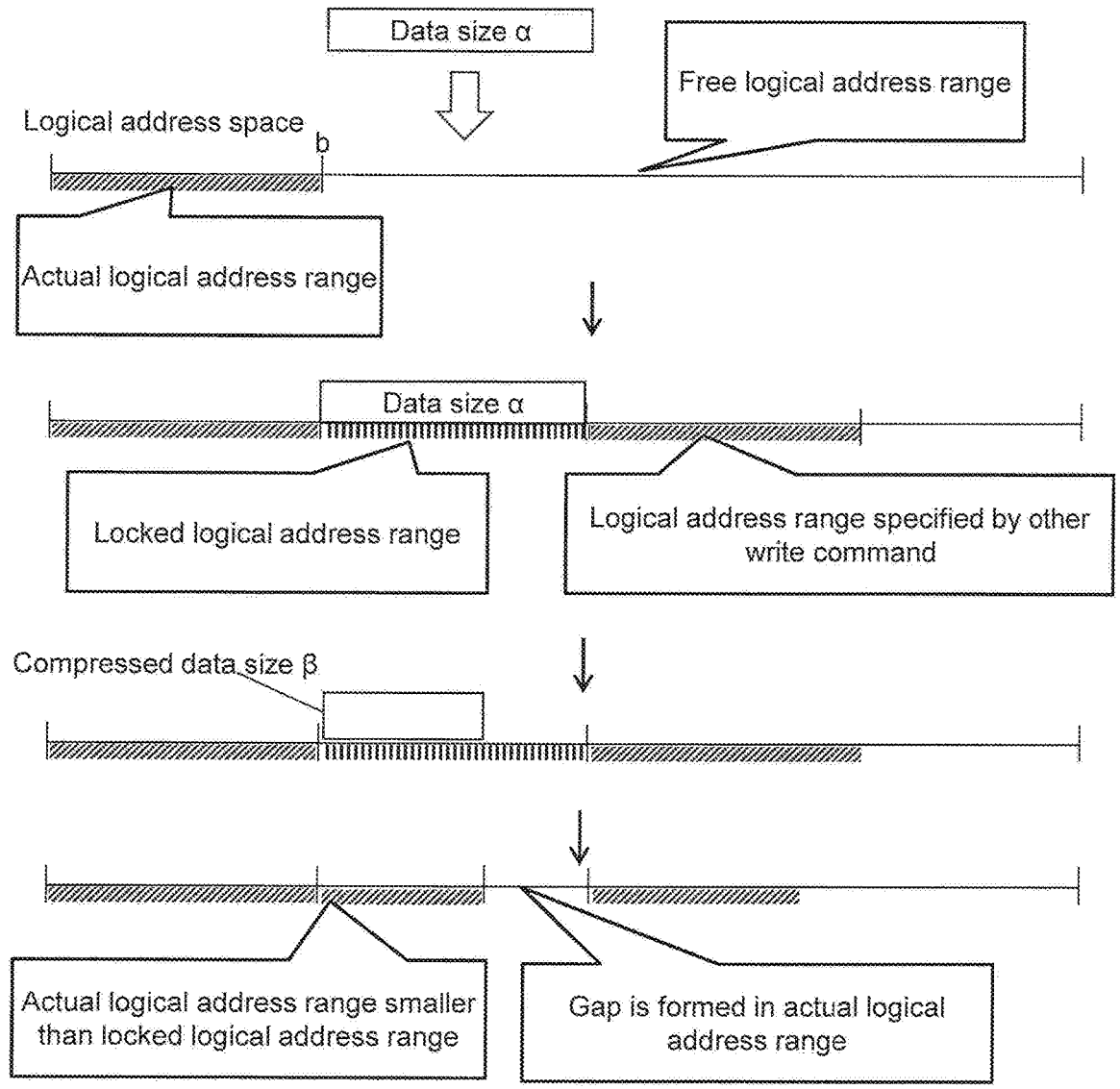
FIG. 18 shows a mechanism by which a gap (a free logical address range) occurs in an actual logical address range, according to the second embodiment.
Figure 19:
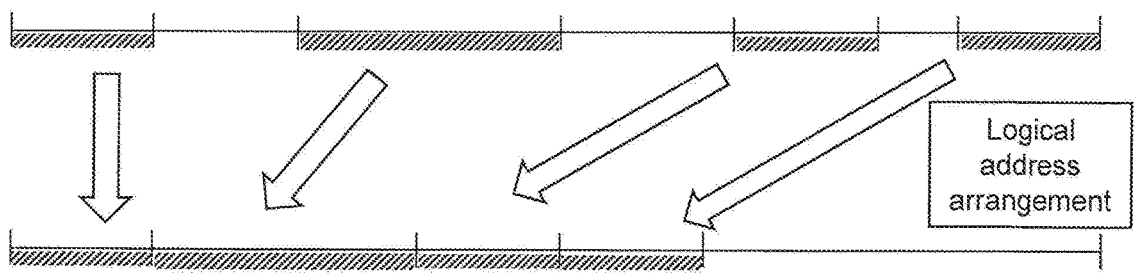
FIG. 19 shows filling of the actual logical address range according to the second embodiment.

In the second embodiment, however, as shown in FIG. 18, the locked logical address range (the logical address range to be locked) is a range defined by the logical address "A" and the data size "α" of the pre-compression data. An actual logical address range (a logical address range used as an actual data storage range), on the other hand, is defined using the compressed data size "β" rather than the data size "α". Hence, the locked logical address range is larger than the actual logical address range. In the other write command, a logical address range that does not overlap the locked logical address range is specified. As a result, a gap is formed in the actual logical address range. When this phenomenon occurs repeatedly, a plurality of free logical address ranges are distributed over the logical address space.

Accordingly, the storage control function 130A transmits a logical address arrangement command, which is a command for lining up a plurality of actual logical address ranges close together, to the FM device 101A. For example, one of (p1) and (p2), described below, may be performed.

(p1) A pre-modification logical address and a modified logical address are specified in the logical address arrangement command for each logical address range. In response to this command, the CTL 151A of the FM device 101A modifies the respective pre-modification logical addresses on the FM management table 500A to the modified logical addresses. The storage control function 130A modifies the respective pre-modification logical addresses on the system management table 400A to the modified logical addresses specified by the logical address arrangement command.

(p2) In response to this command, the CTL 151A of the FM device 101A modifies the respective pre-modification logical addresses on the FM management table 500A to the modified logical addresses and sends back a response to the command. The pre-modification logical addresses and the modified logical addresses are specified in the response. The storage control function 130A modifies the respective pre-modification logical addresses on the system management table 400A to the modified logical addresses specified in the response.

By employing the logical address arrangement command, when a plurality of free logical address ranges are distributed over the logical address space, the actual logical address ranges can be lined up close together, and as a result, these free logical address ranges can be eliminated.

Example 3

A third embodiment will now be described. In this case, the description will focus on differences with the first and second embodiments, and description of common points with the first and second embodiments will be omitted or simplified.

In the third embodiment, third compressed writing processing is employed in place of the first and second compressed writing processing.

Figure 20:
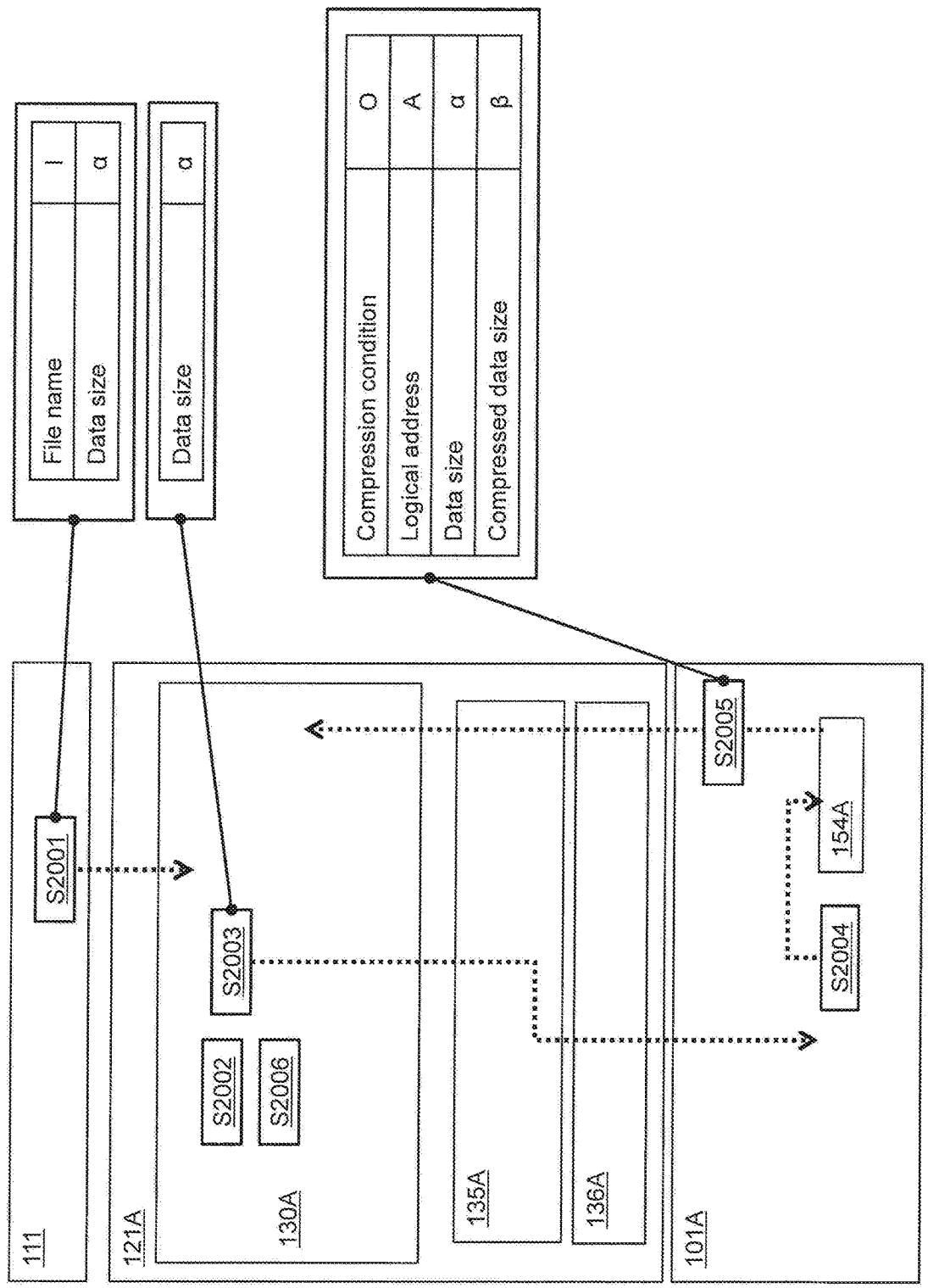
FIG. 20 shows in detail a flow of compressed writing processing according to a third embodiment.

FIG. 20 shows in detail a flow of the third compressed writing processing. The node 121A and the FM device 101A are taken as examples.

In the first and second compressed writing processing, the node 121A has to specify a logical address in the write command. In other words, the node 121A has to manage the free logical address ranges of the logical address space.

Hence, in the third compressed writing processing, the FM device 101A manages the free logical address ranges of the logical address space instead of the node 121A.

More specifically, the following processing is implemented.

The node 121A receives a write request from the client 111 (S2001) and checks whether or not the FM device 101A includes the compressing function (S2002).

When the check result of S2002 is true, the storage control function 130A transmits a compression write command to the FM device 101A to compress the pre-compression data (the data corresponding to the write request) and write the compressed data to the FM 154 (S2003). The data size "α" is specified in the command, but a logical address is not specified. In S2003, the storage control function 130A registers the file name "I" and the data size "α" on the system management table 400A (see reference symbol 400A-21-1 in FIG. 21).

In response to the compression write command from the node 121A, the CTL 151A of the FM device 101A executes S2004 and S2005. More specifically, the CTL 151A compresses the data corresponding to the command by the compressing function 153A and writes the compressed data to the FM 151A (S2004). The CTL 151A then sends a response to the command back to the node 121A (S2005). In S2004, the CTL 151A registers the data size "α" in the FM management table 500A (see reference symbol 500A-22-1 in FIG. 22). Further, in S2004, the CTL 151A determines a logical address "A" to be used as the write destination of the compressed data on the basis of the free logical address range, which is specified from the FM management table 500A, and the size "β" of the compressed data. Moreover, in step S2004, the CTL 154A allocates the physical address "b" to the logical address "A" on the basis of the compressed data size "β". The write destination of the compressed data is a physical area (an area of the FM 151A) indicated by the physical address "b". Furthermore, in S2004, the CTL 151A adds the compression condition "O", the logical address "A", the compressed data size "β", and the physical address "b" to the FM management table 500A (see reference symbol 500A-22-2 in FIG. 22). The compression condition "O", the logical address "A", the data size "α", and the compressed data size "β" are specified in the response of S2005.

The storage control function 130A of the node 121A then adds the compression condition "O", the logical address "A", and the compressed data size "β" specified in the response from the FM device 101A to the system management table 400A (S2006) (see reference symbol 400A-21-2 in FIG. 21).

According to the third compressed writing processing, there is no need for the node 121A to specify a logical address in the write command (i.e. no need to manage the free logical address ranges of the logical address space), and therefore the load on the node 121A can be lightened. Moreover, according to the third compressed writing processing, distribution of a plurality of free logical address ranges does not occur.

Note that in the third embodiment, when the node 121A receives a file deletion request, the storage control function 130A transmits to the FM device 101A an address release command, which is a command for releasing the logical address corresponding to the deletion target file (pre-compression data). It is assumed, for example, that before the address release command is transmitted, the FM management table 500A is as shown by the reference symbol 500A-23-1 in FIG. 23. When, in this state, the node 121A receives a deletion request specifying the file name "I", the storage control function 130A specifies the logical address "A" corresponding to the file name "I" from the system management table 400A and transmits an address release command specifying the logical address "A" to the FM device 101A. In response to this command, the CTL 151A of the FM device 101A deletes the values corresponding to the logical address "A" (excluding the physical address "b") from the FM management table 500A (see reference symbol 500A-23-2 in FIG. 23). As a result, the logical address "A" is released. Note that the reason for leaving the physical address "b" is to manage the existence of deletion target data (invalid data) in the physical area indicated by the physical address "b".

Further, in the third embodiment, a logical address does not have to be registered on the system management table 400A, and in this case, the file name corresponding to the pre-compression data may be registered on the FM management table 500A. The file name may be specified in a command transmitted from the node 121A to the FM device 101A.

Example 4

A fourth embodiment will now be described. In this case, the description will focus on differences with the first to third embodiments, and description of common points with the first to third embodiments will be omitted or simplified.

FIG. 24 shows an example of capacity management according to the fourth embodiment.

It is assumed, for example, that the FM devices 101A to 101C each provide the nodes 121A to 121C with 1 TB of logical address space. Here, 1 TB (the capacity of the logical address space) is equal to the physical storage capacity of the FM 154.

It is assumed that a maximum compression ratio of each of the FM devices 101A to 101C is ⅛ (compression rate= (data size of compressed data)/(data size of pre-compression data)).

Accordingly, the nodes 121A to 121C each provide 8 TB of logical storage space. 8 TB is eight times (the inverse of the maximum compression ratio) 1 TB (the capacity of the logical address space). As a result, 24 TB (=8 TB×3 (the number of nodes)) of logical volume can be seen from the client 111.

According to the fourth embodiment, when a write request for 2 TB of data is received from the client 111, 2 TB are consumed regardless of the data size of the data following compression, and therefore, for the client 111, the remaining capacity is 22 TB (24 TB-2 TB). The amount of data corresponding to the write request corresponds to the amount of used logical volume, and therefore management of the free capacity (the remaining capacity) is easy. Note that the free capacity may be adjusted at a certain timing.

Fifth Embodiment

FIG. 25 shows a configuration of a system management table according to a fifth embodiment.

The system management table 400 expresses a compressed data size for each logical address belonging to the logical address space provided by the FM device 101.

According to this embodiment, when the storage control function 130 of the node 121 receives a response to an I/O command (a write command, for example) specifying a logical address and the response includes a value expressing a compressed data size, the storage control function 130 associates the value (the compressed data size) with the specified logical address. In other words, the storage control function 130 registers the value (the compressed data size) included in the response in the entry (the area of the system management table) corresponding to the specified logical address.

The storage control function 130 then determines logical addresses not associated with compressed data size values (logical addresses at which the compressed data size entry is empty) to be usable logical addresses.

Several embodiments were described above, but these embodiments are merely examples used to illustrate the present invention, and the scope of the present invention is not limited to these embodiments alone. The present invention may be implemented in various other embodiments.

REFERENCE SIGNS LIST

121 Node

The invention claimed is:

1. A storage control method for a scale-out type storage system constituted by a plurality of nodes that include a plurality of nonvolatile memory devices and are coupled to a network, the storage control method comprising the steps of:

transmitting a non-expansion read command for reading data without expanding the data from a first node to a first nonvolatile memory device, the non-expansion read command specifying a logical address corresponding to compressed data;

transmitting a transfer command for transferring transfer target data from the first node to a second node via the network, the transfer command having, as a transfer target, the compressed data read from the first nonvolatile memory device in response to the non-expansion read command without being expanded by a compressing function of the first nonvolatile memory device;

receiving the transfer command in the second node; and transmitting a write command specifying the compressed data as a write target from the second node to a second nonvolatile memory device in response to the transfer command, wherein:

the compressed data being data that have been compressed, the first nonvolatile memory device being a nonvolatile memory device, among the plurality of nonvolatile memory devices, that includes a nonvolatile memory storing the compressed data, the first node being a node, among the plurality of nodes, that includes the first nonvolatile memory device, the second node being any node, among the plurality of nodes, other than the first node, the second nonvolatile memory device being a nonvolatile memory device, among the plurality of nonvolatile memory devices, that is provided in the second node, and each of the first and second nonvolatile memory devices having the compressing function, respectively, which is a function for compressing or decompressing data, the first node is configured to transmit a compression write command for writing data after compressing the data to the first nonvolatile memory device, the compression write command specifying pre-compression data corresponding to the compressed data as the writing target, the compressed data in the nonvolatile memory of the first nonvolatile memory device are compressed by the first nonvolatile memory device by the compressing function of the first nonvolatile memory device in response to the compression write command, wherein the first nonvolatile memory device includes a buffer in addition to the nonvolatile memory;

wherein the first node is configured to manage a data size and a compressed data size for each specified logical address within a logical address space provided by the first nonvolatile memory device;

wherein the storage control method further comprising the steps of:

transmit, by the first node, to the first nonvolatile memory device a compression buffer write command for writing the pre-compression data to the buffer after compressing the pre-compression data, the compression buffer write command specifying the pre-compression data as the data size, receiving, by the first node, a response from the first nonvolatile memory device in response to the compression buffer write command, the response including the size of the compressed data acquired by compressing the pre-compression data as the compressed data size, an address of a buffer area in which the compressed data are stored as a buffer address, and a logical address of a write destination of the compressed data as a logical address, and transmitting, by the first node, to the first nonvolatile memory device a buffer data write command specifying the logical address of the write destination, as well as the compressed data size and the buffer address expressed in the received response, and specifying the compressed data in the buffer area as the write target, wherein transmission of the compression write command corresponds to transmission of the compression buffer write command and the buffer data write command, wherein the first node is configured to lock a logical address range corresponding to the specified logical address and compressed data size from transmission of the buffer data write command to reception of a response to the command so that a logical address belonging to the logical address range is not specified in another write command, and wherein the compressed data in the nonvolatile memory of the first nonvolatile memory device is the compressed data that are acquired by compressing the pre-compression data, and stored in the buffer area by the first nonvolatile memory device in response to the compressed buffer write command and the buffer data write command, and then stored in the nonvolatile memory of the first nonvolatile memory device from the buffer area.

2. A scale-out type storage system comprising a plurality of nodes that include a plurality of nonvolatile memory devices and are coupled to a network, wherein:

each of the plurality of nonvolatile memory devices includes a nonvolatile memory;

each of two or more of the plurality of nonvolatile memory devices includes a compressing function, which is a function for compressing or decompressing data;

a first node is configured to:

transmit a non-expansion read command for reading data without expanding the data to a first nonvolatile memory device, the non-expansion read command specifying a logical address corresponding to compressed data, and transmit a transfer command for transferring transfer target data to a second node via the network, the transfer command specifying, as a transfer target, the compressed data read from the first nonvolatile memory device in response to the non-expansion read command without being expanded by a compressing function of the first nonvolatile memory device;

the second node is configured to receive the transfer command, and transmit a write command specifying the compressed data as a write target to a second nonvolatile memory device in response to the transfer command;

the compressed data are data that have been compressed;

the first nonvolatile memory device is a nonvolatile memory device, among the plurality of nonvolatile memory devices, that includes a nonvolatile memory storing the compressed data;

the first node is a node, among the plurality of nodes, that includes the first nonvolatile memory device;

the second node is any node, among the plurality of nodes, other than the first node; and the second nonvolatile memory device is a nonvolatile memory device, among the plurality of nonvolatile memory devices, that is provided in the second node, wherein the first node is configured to transmit a compression write command for writing data after compressing the data to the first nonvolatile memory device, the compression write command specifying pre-compression data corresponding to the compressed data as the writing target, wherein the compressed data in the nonvolatile memory of the first nonvolatile memory device are compressed by the first nonvolatile memory device by the compressing function of the first nonvolatile memory device in response to the compression write command, wherein the first nonvolatile memory device includes a buffer in addition to the nonvolatile memory;

wherein the first node is configured to manage a data size and a compressed data size for each specified logical address within a logical address space provided by the first nonvolatile memory device;

wherein the first node is configured to:

transmit to the first nonvolatile memory device a compression buffer write command for writing the pre-compression data to the buffer after compressing the pre-compression data, the compression buffer write command specifying the pre-compression data as the data size, receive a response from the first nonvolatile memory device in response to the compression buffer write command, the response including the size of the compressed data acquired by compressing the pre-compression data as the compressed data size, an address of a buffer area in which the compressed data are stored as a buffer address, and a logical address of a write destination of the compressed data as a logical address, and transmit to the first nonvolatile memory device a buffer data write command specifying the logical address of the write destination, as well as the compressed data size and the buffer address expressed in the received response, and specifying the compressed data in the buffer area as the write target;

wherein transmission of the compression write command corresponds to transmission of the compression buffer write command and the buffer data write command, wherein the first node is configured to lock a logical address range corresponding to the specified logical address and compressed data size from transmission of the buffer data write command to reception of a response to the command so that a logical address belonging to the logical address range is not specified in another write command; and wherein the compressed data in the nonvolatile memory of the first nonvolatile memory device is the compressed data that are acquired by compressing the pre-compression data, and stored in the buffer area by the first nonvolatile memory device in response to the compressed buffer write command and the buffer data write command, and then stored in the nonvolatile memory of the first nonvolatile memory device from the buffer area.

3. The scale-out type storage system according to claim 2, wherein the second node is a node that includes the second nonvolatile memory device, the second nonvolatile memory device having a compressing function equivalent to the compressing function of the first nonvolatile memory device.

4. The scale-out type storage system according to claim 3, wherein the first node is configured to execute a node search to search for a node, among the nodes other than the first node, that includes a nonvolatile memory device having a compressing function equivalent to the compressing function of the first nonvolatile memory device, and the second node is a node found in the node search.

5. The scale-out type storage system according to claim 3, wherein the write command specifying the compressed data as the write target is a non-compression write command for writing data without compressing the data.

6. The scale-out type storage system according to claim 5, wherein the second nonvolatile memory device is configured to manage a data size and a compressed data size for each specified logical address within a logical address space provided by the second nonvolatile memory device, a pre-compression data size of the compressed data and a size of the compressed data are specified in the transfer command by the first node as the data size and the compressed data size, respectively, and the data size and the compressed data size specified in the transfer command are specified in the non-compression write command in addition to a logical address serving as a write destination of the compressed data.

7. The scale-out type storage system according to claim 2, wherein the first node is configured to determine whether or not the first nonvolatile memory device includes the compressing function, and transmit the non-expansion read command to the first nonvolatile memory device when the determination result is true.

8. The scale-out type storage system according to claim 2, wherein the first node is configured to transmit to the first nonvolatile memory device a logical address arrangement command for lining up a plurality of actual logical address ranges close together, and wherein each of the plurality of actual logical address ranges is a logical address range serving as an actual data storage range for the compressed data.

9. The scale-out type storage system according to claim 2, wherein, when the pre-compression data are to be deleted, the first node is configured to transmit an address release command to the first nonvolatile memory device for releasing the logical address corresponding to the pre-compression data.

10. The scale-out type storage system according to claim 2, wherein the first node is configured to determine whether or not the first nonvolatile memory device, which serves as a storage location of the pre-compression data, includes the compressing function, and transmit the compression write command to the first nonvolatile memory device when the determination result is true.

11. A storage apparatus serving as any of a plurality of nodes that include a plurality of nonvolatile memory devices, are coupled to a network, and constitute a scale-out type storage system, the storage apparatus comprising:

a first interface unit constituted by one or more interfaces coupled to a first nonvolatile memory device;

a second interface unit constituted by one or more interfaces coupled to the network; and a processor unit constituted by one or more processors coupled to the first and second interface units, wherein:

each of the plurality of nonvolatile memory devices includes a nonvolatile memory and a compressing function, which is a function for compressing or decompressing data;

when the first nonvolatile memory device has a nonvolatile memory in which first compressed data are stored, the processor unit is configured to:

transmit a non-expansion read command for reading data without expanding the data to the first nonvolatile memory device, the non-expansion read command specifying a logical address corresponding to the first compressed data, and transmit a first transfer command for transferring transfer target data from the storage apparatus to another node over the network, the transfer command specifying, as a transfer target, the first compressed data read from the first nonvolatile memory device in response to the non-expansion read command without being expanded by the compressing function of the first nonvolatile memory device;

the processor unit, having received a second transfer command for transferring transfer target data from any one of the other nodes, the second transfer command including second compressed data as a transfer target, is configured to transmit a write command specifying the second compressed data as the write target to the first nonvolatile memory device in response to the received second transfer command; and each of the first and second compressed data are data that have been compressed, wherein the storage apparatus is configured to transmit a compression write command for writing data after compressing the data to the first nonvolatile memory device, the compression write command specifying pre-compression data corresponding to the compressed data as the writing target, wherein the compressed data in the nonvolatile memory of the first nonvolatile memory device are compressed by the first nonvolatile memory device by the compressing function of the first nonvolatile memory device in response to the compression write command, wherein the first nonvolatile memory device includes a buffer in addition to the nonvolatile memory;

wherein the storage apparatus is configured to manage a data size and a compressed data size for each specified logical address within a logical address space provided by the first nonvolatile memory device;

wherein the storage apparatus is configured to:

transmit to the first nonvolatile memory device a compression buffer write command for writing the pre-compression data to the buffer after compressing the pre-compression data, the compression buffer write command specifying the pre-compression data as the data size, receive a response from the first nonvolatile memory device in response to the compression buffer write command, the response including the size of the compressed data acquired by compressing the pre-compression data as the compressed data size, an address of a buffer area in which the compressed data are stored as a buffer address, and a logical address of a write destination of the compressed data as a logical address, and transmit to the first nonvolatile memory device a buffer data write command specifying the logical address of the write destination, as well as the compressed data size and the buffer address expressed in the received response, and specifying the compressed data in the buffer area as the write target;

wherein transmission of the compression write command corresponds to transmission of the compression buffer write command and the buffer data write command, wherein the storage apparatus is configured to lock a logical address range corresponding to the specified logical address and compressed data size from transmission of the buffer data write command to reception of a response to the command so that a logical address belonging to the logical address range is not specified in another write command; and wherein the compressed data in the nonvolatile memory of the first nonvolatile memory device is the compressed data that are acquired by compressing the pre-compression data, and stored in the buffer area by the first nonvolatile memory device in response to the compressed buffer write command and the buffer data write command, and then stored in the nonvolatile memory of the first nonvolatile memory device from the buffer area.

* * * * *